United States Patent
Ushiki et al.

(10) Patent No.: US 6,311,065 B1
(45) Date of Patent: *Oct. 30, 2001

(54) MOBILE COMMUNICATION SYSTEM FOR PREDICTING A TRANSFER LOCATION OF A MOBILE STATION

(75) Inventors: Kazumasa Ushiki; Mitsunori Fukazawa, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,715

(22) Filed: Feb. 12, 1998

(30) Foreign Application Priority Data

Feb. 12, 1997 (JP) .................................................. 9-027450
Oct. 16, 1997 (JP) .................................................. 9-284027

(51) Int. Cl.[7] ........................................................ H04Q 7/20
(52) U.S. Cl. .................... 455/440; 455/437; 455/439; 455/456; 342/457
(58) Field of Search .................................... 455/436, 437, 455/438, 441, 439, 444, 456, 450, 67.1, 515, 440, 433; 342/457, 357.09, 452; 370/331, 332

(56) References Cited

U.S. PATENT DOCUMENTS 5,394,158 * 2/1995 Chia ...................................... 455/438
5,432,842 7/1995 Kinoshita et al. .

(List continued on next page.)

FOREIGN PATENT DOCUMENTS

| 0 369 535 | 5/1990 | (EP) . |
| 0 631 451 | 12/1994 | (EP) . |
| 6-86359 | 3/1994 | (JP) . |
| WO/96/13951 | 5/1996 | (WO) . |
| WO/98/12885 | 3/1998 | (WO) . |

OTHER PUBLICATIONS

Merriam–Webster's Collegiate® Dictionary, 10th ed., Merriam–Webster Inc., 1997, p. 1253.*
Handoff Criteria for Personal Communication Networks V. Kappor, G. Edwards, R. Sankar Department of Electric Engineering University of South Florida, Tampa, FL 33620.

* cited by examiner

Primary Examiner—Vivian Chang
Assistant Examiner—Eliseo Ramos-Feliciano
(74) Attorney, Agent, or Firm—Helfgott & Karas, P.C.

(57) ABSTRACT

A mobile communication system which performs a handover operation with high-reliability, while the system can flexibly cope with various circumstances in which a mobile station is used, without changing a hardware structure. A plurality of radio base stations form respective radio communication cells. Each of the radio base stations performs a radio channel setting control including a handover with respect to a call originated for the mobile station located in one of the cells. An exchange is connected to each of the radio base stations via a communication link so that the exchange performs a call process of the call in association with the radio channel setting control performed by the radio base stations. After the call becomes a completed call and prior to a handover operation, a movement of the mobile station from one of the cells in which the mobile station is located to another one of the cells adjacent to the one of the cells is predicted based on at least one of procedures of the radio channel setting control and the call process. When the movement is predicted so as to select candidate cells which are candidates of a transferee of the completed call, a free radio channel of the cells is acquired. A path connected to the acquired free radio channel is formed in the communication link.

63 Claims, 29 Drawing Sheets

U.S. PATENT DOCUMENTS

| | | | |
|---|---|---|---|
| 5,640,676 | * | 6/1997 | Garncarz et al. ..................... 455/436 |
| 5,754,958 | * | 5/1998 | Tsuji et al. ............................ 455/436 |
| 5,787,348 | * | 7/1998 | Willey et al. ......................... 455/438 |
| 5,884,178 | * | 3/1999 | Ericsson et al. ..................... 455/436 |
| 5,896,373 | * | 4/1999 | Mitts et al. .......................... 455/436 |
| 5,940,371 | * | 8/1999 | Mitts et al. .......................... 455/436 |
| 5,974,318 | * | 10/1999 | Satarasinghe ....................... 455/436 |
| 5,995,837 | * | 11/1999 | Saito et al. .......................... 455/436 |
| 6,006,092 | * | 12/1999 | Ward .................................... 455/438 |
| 6,011,970 | * | 1/2000 | McCarthy ............................ 455/436 |
| 6,011,971 | * | 1/2000 | Jolma ................................... 455/438 |
| 6,014,564 | * | 1/2000 | Donis et al. ......................... 455/436 |

FIG. 7

| CALL MANAGEMENT NUMBER | CANDIDATE CELL | | CANDIDATE PATH | |
|---|---|---|---|---|
| | CANDIDATE EXCHANGE NUMBER | CANDIDATE CELL NUMBER | CANDIDATE PATH NUMBER | CANDIDATE PATH STATUS INFORMATION |
| 1 | | | | |
| 2 | | | | |
| ... | ... | ... | ... | ... |

| MOVING PATTERN (PERMUTATION OF PRIORLY PRESENT CELLS) | | | | PROBABILITY OF SHIFT (%) |
|---|---|---|---|---|
| 1-4 | 1-3 | ... | 1-1 | 10 |
| 1-5 | 1-6 | ... | 1-2 | 40 |
| | ... | | ... | ... |

254

APPLICABLE CONDITION

FIG. 13

| ONE CELL | | THE OTHER CELL | |
|---|---|---|---|
| EXCHANGE NUMBER | CELL NUMBER | EXCHANGE NUMBER | CELL NUMBER |
| . . . | . . . | . . . | . . . |

| ONE CELL | | THE OTHER CELL | | DISTANCE BETWEEN CELLS |
|---|---|---|---|---|
| EXCHANGE NUMBER | CELL NUMBER | EXCHANGE NUMBER | CELL NUMBER | |
| 1 | 0 | 1 | 7 | 2 |
| 1 | 0 | 1 | 8 | 2 |
| ... | ... | ... | ... | ... |

| CANDIDATE PATH INDENTIFIER | PATH SETTING CELL INDENTIFIER | | LINE IDENTIFIER | | ACQUIRED BAND | PATH TYPE |
|---|---|---|---|---|---|---|
| | EXCHANGE NUMBER | BASE STATION NUMBER | OUTGOING PATH NUMBER | INCOMING PATH NUMBER | | |
| | | | | | | |
| | | | | | | |
| | | | | | | |

| CALL MANAGEMENT NUMBER | CANDIDATE CELL | | CANDIDATE PATH | | | |
|---|---|---|---|---|---|---|
| | EXCHANGE NUMBER | BASE STATION NUMBER | PATH NUMBER | PATH TYPE | PATH STATUS | TIME STAMP |
| | | | | | | |
| | | | | | | |
| | | | | | | |

258

MOBILE COMMUNICATION SYSTEM FOR PREDICTING A TRANSFER LOCATION OF A MOBILE STATION

BACKGROUND OF THE INVENTION

1. The present invention relates to a mobile communication system and, more particularly, to a mobile communication system in which a handover of a mobile station is performed when a completed call is originated while the mobile station is moving.

2. Description of the Related Art

In recent years, terminals of mobile communication system are rapidly spreading due to liberalization of the market and application of high-level digital transmission techniques. Such terminals are further spread in response to development and widespread use of a system such as a personal handy phone system (PHS) which offers a low-cost mobile communication service. The development is directed to an application for satisfying versatile needs. Accordingly, when such a terminal is used in a highspeed traffic system and when a completed call originates while a mobile station is moving, the number of times of handover of the call is increased as speed of movement of the mobile station increases.

In a conventional mobile communication system, when the completed call is originated while a mobile station is moving, a mobile station (hereinafter referred to as a transferor cell) in which the completed call is currently originating and a radio base station (hereinafter referred to as a transferor base station) form a cell (radio zone) in which the mobile station is located. The mobile station and the base station cooperate with each other so as to measure transmission quality of the radio transmission paths for adjacent cells or peripheral cells (hereinafter referred to as the adjacent cells as a whole) which are candidates for the mobile station to be moved. The measurement based on an electric field intensity in addition to measurements of transmission quality in the transferor cell. The transferor base station compares the measured transmission qualities, and performs a radio channel setting control operation necessary for resuming the current communication when the transmission quality of the transferor cell is higher than that of the adjacent cells. However, on the contrary, if the transmission quality of the adjacent cells is higher than that of the transferor cell, the transferor base station determines the candidate of the adjacent cell (hereinafter referred to as an adjacent cell) to which the mobile station will be moved by a handover based on a descending order of transmission quality. Additionally, the transferor base station sends a notification that the radio base station forming the adjacent cell (hereinafter referred to as candidate base station) is set as a destination for handover of the call. The notification includes necessary information as the transferee base station.

On the other hand, upon recognition of the notification, the candidate base station seeks a radio channel which is currently available, and assigns the available channel to a call for the mobile station entering the candidate base station. The candidate base station sends the result to the transferor base station, and starts a communication test through the assigned channel. It should be noted that the radio channel thus assigned is hereinafter referred to as a candidate channel.

Additionally, the transferor base station discriminates the notified candidate channel, and sends discrimination information of the radio channel (candidate channel) to the mobile station.

Thereafter, the mobile station performs the abovementioned communication test by cooperating with the candidate base station through the radio channel (candidate channel) indicated by the discrimination information. If the communication test ends in a normal condition, the result is sent to the transferor base station.

Upon the receipt of the completion of the communication test from the mobile station, the transferor base station transfers the result to the transferee base station, and sends a notification to an exchange (hereinafter referred to as a transferor exchange) which controls the transferor base station. The notification indicates the discrimination information (such as a mobile station number) corresponding to the call and the discrimination information of the candidate channel.

Thereafter, upon recognition of the abovementioned notification, the transferee base station performs a process for connecting the candidate channel to a corresponding communication path of the call by cooperating with an exchange (hereinafter referred to as a transferee exchange) which is controlled by the transferee exchange. The transferee base station sends to the transferor base station a notification which indicates a completion of such process.

Upon recognition of the notification, the transferor base station releases the radio channel which has been assigned to the corresponding call.

As a result, the mobile station, which is moving to one of the candidate cells while maintaining communication after the completed call is originated, can acquire such a candidate cell and a call assigned to the candidate cell. Additionally, a radio transmission path used for a communication is positively reserved as long as a channel setting control is performed by cooperation of the transferor base station and the candidate base station based on the abovementioned procedure.

Additionally, in the conventional PHS, a mobile station automatically recognizes that the mobile station is positioned close to the outside of the transferor cell, and selects the candidate cell. Then, the mobile station directly sends to the candidate base station, which forms the candidate cell a request for handover (hereinafter referred to as a handover request).

The candidate base station achieves the handover by performing a process equivalent to the process performed by the above-mentioned conventional system in cooperation with the transferor base station.

Accordingly, a handover can be achieved in a city area in which a transmission characteristic of the transmission path rapidly deteriorates due to buildings located between the mobile station and the transferor base station even when the mobile station, in which the completed call originates, is located within a short distance from the transferor base station.

However, in the above-mentioned conventional system, the selection of the candidate cell is not performed until the mobile station reaches a position close to the outside of the transferor cell even when the transferor cell and the adjacent cell overlap with each other. Thus, when the mobile station moves at an extremely high speed or the transmission characteristic of the transmission path intensely fluctuates, there is a high probability that the handover is not normally performed.

Additionally, in the PHS, upon recognition of the handover, the candidate base station confirms that the mobile station is the correct mobile station by performing a proving test with respect to the mobile station which is a sender of the handover request. However, such a proving test requires a large amount of data processing in the candidate base station since a database, which is previously and systematically constructed with respect to each of the mobile stations accommodated in the system, must be referred to.

Additionally, in the PHS, there is a high-possibility that the communication service is interrupted at a high frequency when the mobile station, which is an object of the handover, is moving at an extremely high speed since the PHS inherently has a small diameter cell and a reuse of a radio frequency is positively attempted. However, such a reduction in the cell diameter and reuse of the radio frequency is effective especially for positive relief from a dead zone in the city area and for positively and economically forming a cell which can maintain a high quality transmission characteristic.

Accordingly, when the reduction in the cell diameter and the reuse of the radio frequency are attempted in mobile communication systems other than the PHS, there is a high-probability that the communication service is interrupted in the same manner.

SUMMARY OF THE INVENTION

It is a general object of the present invention to provide an improved and useful mobile communication system in which the above-mentioned problems are eliminated.

A more specific object of the present invention is to provide a mobile communication system which performs a handover operation with high-reliability, while the system can flexibly cope with various circumstances in which a mobile station is used, without changing a hardware structure of the mobile communication system.

In order to achieve the above-mentioned objects, as shown in FIG. 1, there is provided according to one aspect of the present invention a mobile communication system comprising:

a plurality of radio base stations (12-1 to 12-N) forming respective radio communication zones according to one of a small zone structure and a sector structure, each of said radio base stations performing a radio channel setting control including a handover with respect to a call originated for a mobile station (11) located in one of said radio communication zones; and an exchange (13) connected to each of said radio base stations via a communication link so that said exchange performs a call process of said call in association with the radio channel setting control performed by said radio base stations (12-1 to 12-N), said mobile communication system being characterized by:

a moment predicting unit (14) which predicts, after said call becomes a completed call and prior to a handover operation, a movement of said mobile station from one of said radio communication zones in which said mobile station (11) is located to another one of said radio communication zones adjacent to said one of said radio communication zones, a prediction of said movement being performed based on at least one of procedures of the radio channel setting control and the call process; and a candidate zone selecting unit (15) which is activated when said movement is predicted by said moment predicting unit (14) so as to select candidate radio communication zones which are candidates of a transferee of said completed call, said candidate zone selecting unit acquiring a free radio channel of said candidate radio communication zones, said candidate zone selecting unit forming a path connected to said acquired free radio channel in said communication link.

According to the above-mentioned invention, since the path connected to radio channel to be used to continue a communication in the candidate radio communication zone which is a candidate of a transferee of the corresponding completed call is formed prior to a start of a radio channel setting control and a call process which are related to a handover of the communication channel, the radio channel setting control and the call process which are actually started to achieve the handover of the communication channel are simplified and the response is speeded up.

Additionally, as shown in FIG. 1, there is provided according to another aspect of the present invention a mobile communication system comprising:

a plurality of radio base stations (12-1 to 12-N) forming respective radio communication zones according to one of a small zone structure and a sector structure, each of said radio base stations performing a radio channel setting control including a handover with respect to a call originated for a mobile station (11) located in one of said radio communication zones; and an exchange (13) connected to each of said radio base stations via a communication link so that said exchange performs a call process of said call in association with the radio channel setting control performed by said radio base stations, said mobile communication system being characterized by:

a moment predicting unit (14) which predicts, after said call becomes a completed call and prior to a handover operation, a movement of said mobile station from one of said radio communication zones in which said mobile station is located to another one of said radio communication zones adjacent to said one of said radio communication zones, a prediction of said movement being performed based on at least one of procedures of the radio channel setting control and the call process; and a candidate zone selecting unit (21) which is activated when said movement is predicted by said moment predicting unit (14) so as to select candidate radio communication zones which are candidates of a transferee of said completed call, said candidate zone selecting unit forming a path corresponding to said communication link to said candidates of a transferee, wherein each of said radio base stations (12-1 to 12-N) includes means for determining whether or not said transferee corresponds to one of said radio communication zones during a process of a handover of said completed call and for acquiring a free radio channel of said one of said candidate radio communication zones when a result of a determination is affirmative, said means connecting said acquired free radio channel to the communication link formed by said candidate zone selecting unit.

According to the above-mentioned invention, since a process for forming the path is performed with respect to only the candidate radio communication zone which becomes a transferee, a path is not necessarily formed for the candidate radio communication zone which does not become a transferee. Thus, an amount of process needed for a handover is reduced.

Additionally, as shown in FIG. 2, there is provided according to another aspect of the present invention a mobile communication system comprising:

a mobile station (31) which can be located in one of a plurality of radio communication zones according to a small zone structure or a sector structure;

a plurality of radio base stations (32-1 to 32-N) forming said respective radio communication zones, each of said radio base stations performing a radio channel setting control including a handover with respect to a call originated for said mobile station (31) located in one of said radio communication zones; and an exchange (33) connected to each of said radio base stations via a communication link so that said exchange performs a call process of said call in association with the radio channel setting control performed by said radio base stations, said mobile communication system being characterized by:

a candidate zone notification unit (35) which selects, after said call becomes a completed call, candidate radio communication zones which are candidates of a transferee of the completed call so as to announce the candidate radio communication zones to said mobile station; and a candidate zone selecting unit (36) which acquires a free radio channel of the candidate radio communication zones selected by said candidate zone selecting unit when a request is provided from said mobile station, and forms a path connected to said radio channel in said communication link, wherein said mobile station includes a moment predicting unit (37) which predicts a movement of said mobile station from one of said radio communication zones in which said mobile station is located to another one of said radio communication zones adjacent to said one of said radio communication zones, and when a result of a prediction indicates one of the candidate radio communication zones announced by said candidate zone notification unit (35), said moment predicting unit (37) provides the result to said candidate zone selecting unit as said request.

According to the above-mentioned invention, a moment when the candidate radio frequency zones are selected is provided by the mobile station (31). Since the path connected to a radio channel to be used to continue a communication in the candidate radio communication zone which is a candidate of a transferee of the corresponding completed call is formed prior to a start of a radio channel setting control and a call process which are related to a handover of the communication channel, the radio channel setting control and the call process which are actually started to achieve the handover of the communication channel are simplified and the response is speeded up.

Additionally, as shown in FIG. 2, there is provided according to another aspect of the present invention a mobile communication system comprising:

a mobile station (31) which can be located in one of a plurality of radio communication zones according to a small zone structure or a sector structure;

a plurality of radio base stations (32-1 to 32-N) forming said respective radio communication zones, each of said radio base stations performing a radio channel setting control including a handover with respect to a call originated for said mobile station (31) located in one of said radio communication zones; and an exchange (33) connected to each of said radio base stations via a communication link so that said exchange performs a call process of said call in association with the radio channel setting control performed by said radio base stations, said mobile communication system being characterized by:

a candidate zone notification unit (35) which selects, after said call becomes a completed call, candidate radio communication zones which are candidates of a transferee of the completed call so as to announce the candidate radio communication zones to said mobile station (31); and a candidate zone selecting unit (41) which selects the candidate radio communication zones selected by said candidate zone notification unit (35) when a request is provided from said mobile station (31), and forms a communication link to the radio base station in said candidate radio communication zone, wherein said mobile station (31) includes a moment predicting unit (37) which predicts a movement of said mobile station from one of said radio communication zones in which said mobile station is located to another one of said radio communication zones adjacent to said one of said radio communication zones, and when a result of a prediction indicates one of the candidate radio communication zones announced by said candidate zone notification unit (35), said moment predicting unit (37) provides the result to said candidate zone selecting unit as said request; and each of said radio base stations (32-1 to 32-N) includes means for determining whether or not said transferee corresponds to one of said radio communication zones during a process of a handover of said completed call and for acquiring a free radio channel of said one of said candidate radio communication zones when a result of a determination is affirmative, said means connecting said acquired free radio channel to the communication link formed by said candidate zone selecting unit (41).

According to the above-mentioned invention, since a process for forming the path is performed with respect to only the candidate radio communication zone which becomes a transferee, a path is not necessarily formed for the candidate radio communication zone which does not become a transferee. Thus, a total amount of process needed for a handover is reduced.

The above-mentioned mobile communication systems may further comprise a moving pattern storing unit (51) in which a moving pattern is previously registered, said moving pattern indicated by a permutation of discrimination information with respect to said radio communication zones through which one of a railway or a road crosses, wherein said candidate zone selecting unit selects, as said candidate radio communication zones, subsequent radio communication zones indicated by a moving pattern having a high correlation with said moving pattern registered in said moving pattern storing unit, the moving pattern having a high correlation corresponding to a train of discrimination information including a current radio communication zone in which said mobile station (11, 31) is currently located and a previous radio communication zone in which said mobile station was previously located.

According to the above-mentioned invention, since the candidate radio communication zones are selected from the radio communication zones which are formed along a path along which the mobile station in which a completed call is originated is moving in addition to a change in a transmission quality such as an electric field intensity, the candidate radio communication zone can be accurately selected before the mobile station moves to a periphery of the radio communication zone in which the mobile station is currently located. Additionally, even when the transmission quality is extremely deteriorated due to a fluctuation of a transmission characteristic of the radio transmission path, the candidate radio communication zone become a transferee radio communication zone with a high probability.

Alternatively, the above-mentioned mobile communication system may further comprise a moving pattern storing unit (61) in which a moving pattern announced by a subscriber of said mobile station (11, 31) is previously registered, said moving pattern indicated by a permutation of discrimination information with respect to said radio communication zones through which one of a railway or a road crosses so that said mobile station moves along said one of the railway or the road with a high probability, wherein said candidate zone selecting unit selects, as said candidate radio communication zones, subsequent radio communication zones indicated by a moving pattern having a high correlation with said moving pattern registered in said moving pattern storing unit, the moving pattern having a high correlation corresponding to a train of discrimination information including a current radio communication zone in which said mobile station is currently located and a previous radio communication zone in which said mobile station was previously located.

According to this invention, since the candidate radio communication zone is selected based on the moving pattern indicated by a permutation of discrimination information with respect to the radio communication zones formed along the path along which the mobile station (11) is frequently moves, the candidate radio communication zone can be selected and becomes the transferee radio communication channel with a high probability. Additionally, with respect to a process for selecting the candidate radio communication zone, as long as the path along which the mobile station is moving corresponds to one of the moving patterns registered in the moving pattern storing unit (61), an amount of information of moving patterns to be searched for in the process is reduced, and a response can be speeded up. Further, a probability of the selection of the candidate radio communication zone can be increased by using the moving pattern corresponding to the subscriber.

Additionally, the above-mentioned mobile communication systems may further comprise a moving pattern history unit (71) which obtains a history of the radio communication zones in which said mobile station is located from among said plurality of radio communication zones so as to record the history as a train of discrimination information with respect to the radio communication zones without cooperating with said mobile station, wherein said candidate zone selecting unit selects, as said candidate radio communication zones, subsequent radio communication zones indicated by a moving pattern having a high correlation with a moving pattern recorded in said moving pattern history unit with respect to a mobile station in which a completed call is originated, the moving pattern having a high correlation corresponding to a train of discrimination information including a current radio communication zone in which said mobile station is currently located and a previous radio communication zone in which said mobile station was previously located.

According to this invention, since the moving pattern registered in the moving pattern history unit (71) is updated as a history which conforms to an actual moving path of the mobile station, the probability of the candidate radio communication zone, which is selected by the candidate zone selecting unit, becoming the transferee radio communication zone is increased.

Additionally, the above-mentioned mobile communication systems may further comprise a moving pattern history unit (81) which obtains a history of the radio communication zones in which said mobile station is located from among said plurality of radio communication zones so as to record the history as a train of discrimination information with respect to the radio communication zones by cooperating with said mobile station, wherein said candidate zone selecting unit selects, as said candidate radio communication zones, subsequent radio communication zones indicated by a moving pattern having a high correlation with said moving pattern recorded in said moving pattern history unit with respect to a mobile station in which a completed call is originate, the moving pattern having a high correlation corresponding to a train of discrimination information including a current radio communication zone in which said mobile station is currently located and a previous radio communication zone in which said mobile station was previously located.

According to this invention, since the moving pattern registered in the moving pattern history unit (81) is updated as a history which conforms to an actual moving path of each mobile station, the probability of the candidate radio communication zone, which is selected by the candidate zone selecting unit, becoming the transferee radio communication zone is increased as compared to the mobile communication system in which the moving pattern is commonly set for all mobile stations.

Additionally, the above-mentioned mobile communication systems may further comprise a shift probability storing unit (91) which stores a provability to become a radio communication zone to be handover with respect to each of said plurality of radio communication zones, the probability being previously obtained by a simulation or an actual measurement based on a distribution of at least one of a road and a railway and a distribution of a traffic of said mobile station in at least one of the road and the railway, wherein said candidate zone selecting unit includes means for excluding a candidate radio communication zone having the probability less than a predetermined lower limit value from among the probabilities registered in said shift probability storing unit or providing a higher priority as the probability of shift is higher.

According to this invention, since the radio communication zone into which the mobile stations are concentrated is selected with a priority, a probability of thus selected candidate radio communication zone becoming a transferee radio communication zone is increased.

Additionally, the above-mentioned mobile communication systems may further comprise an adjacent zone storing unit (101) in which discrimination information of the radio communication zones adjacent to each of said plurality of radio communication zones is registered, wherein said candidate zone selecting unit includes means for determining whether or not the selected candidate radio communication zone corresponds to a radio communication zone adjacent to a radio communication zone which is a transferee so as to exclude a candidate radio communication zone to which a negative result of a determination is made.

According to this invention, since only the radio communication zone which is adjacent to the radio communication zone is selected from among the candidate radio communication zones selected by the candidate zone selecting unit is selected as a normal candidate radio communication zone, the resources is not unnecessarily acquired when there are some errors in the subscriber's announcement or the history. Thus, the normal candidate radio communication zone becomes a transferee radio communication zone with a high probability.

Additionally, the above-mentioned mobile communication systems may further comprise a zone structure storing unit (111) in which a correspondence between each of said plurality of radio communication zones and an exchange controlling radio base stations forming the respective radio communication zones is previously stored, wherein said candidate zone selecting unit includes means for selecting, from among the selected candidate radio communication zones, a candidate radio communication zone formed by a radio base station controlled by an exchange which is different from an exchange having a radio base station forming a radio communication zone corresponding to a transferee by referring to the correspondence stored in said zone structure storing unit so as to exclude remaining candidate radio communication zones other than said candidate radio communication zone based on an attribute of a completed call obtained based on at least one of the radio channel setting control and the call process.

According to this invention, since a determination is made as to whether or not the radio communication zone, which is formed by a radio base station controlled by the same exchange with the exchange having a radio communication zone in which the mobile station is currently located, is selected as a candidate radio communication zone based on an attribute of the completed call, the system can flexibly cooperate with an allowable upper limit of an amount of process or a required service quality with respect to a handover.

In the above-mentioned invention, the attribute of the completed call of which candidate radio communication zone is to be excluded may be a service quality required for the completed call which should be less than a predetermined threshold value.

Accordingly, a selection of the candidate radio communication zone only over different exchanges can be performed for calls which require a relatively lower service quality.

Additionally, the above-mentioned mobile communication systems may further comprise an adjacent zone storing unit (101) in which discrimination information with respect to each of said plurality of radio communication zones is stored, wherein said candidate zone selecting unit determines whether or not a service quality required for the completed call is greater than a predetermined threshold level so as to obtain all of radio communication zones adjacent to the radio communication zone in which said mobile station having a completed call is located when a result of a determination is affirmative, said candidate zone selecting unit selecting the obtained radio communication zones as the candidate radio communication zones.

According to this invention, since all adjacent zones are selected as the candidate radio communication zones based on the above-mentioned simple operation with respect to a completed call which requires a high service quality, a probability of handover being normally performed in relation to a service quality can be increased.

Additionally, in the mobile communication systems according to the present invention, an asynchronous transfer mode may be applied to said communication link, and said candidate zone selecting unit may logically form a path without occupying transmission band of said communication link, wherein said radio base station and said exchange include means for acquiring a transmission band of a path formed by said candidate zone selecting unit with respect to the candidate radio communication zone which corresponds to a transferee of the completed call based on procedures of the radio channel setting control and the call process.

Accordingly, since the transmission band of the candidate communication zone is not occupied unless the candidate radio communication zone becomes a transferee, an efficiency of use of the communication link is increased and an amount of process needed for a handover is reduced.

In the above-mentioned invention, said radio base station and said exchange may include means for determining whether or not the candidate radio communication zone selected by said candidate zone selecting unit has a possibility to become a transferee of a completed call based on the procedures of the radio channel setting control and the call process so as to release the acquired transmission band of a path of a candidate radio communication path to which a negative result of a determination is made.

Accordingly, since the transmission band of the candidate radio communication zone which did not become a transferee is avoided to be unnecessarily occupied, the efficiency of use of the communication link is further increased.

Additionally, in the mobile communication systems according to the present invention, said exchange may include means for obtaining a priority of services required for a completed call based on the procedure of the call process, and said candidate zone selecting unit may include means for setting a higher value to an upper limit value of a number of selectable candidate radio communication zones with respect to said completed call as the priority obtained by said exchange is increased.

Accordingly, the probability of the candidate radio communication zone becoming a transferee zone is increased as the call has a higher priority. Additionally, since it is avoided to select many candidate radio communication zones with respect to a completed call having a low priority, the resources such as each radio communication zone or a path corresponding to a radio channel of the radio communication zone can be efficiently used in accordance with their priority.

Additionally, in the mobile communication systems according to the present invention, said exchange may include means for obtaining a service quality required for a completed call based on the procedure of the call process, and said candidate zone selecting unit may include means for setting a higher value to an upper limit value of a number of selectable candidate radio communication zones with respect to said completed call as the service quality obtained by said exchange is increased.

Accordingly, since it is avoided to select many candidate radio communication zones with respect to a completed call to which a low transmission quality is requested, the resources such as each radio communication zone or a path corresponding to a radio channel of the radio communication zone can be efficiently used in accordance with their transmission quality.

Additionally, in the mobile communication systems according to the present invention, said exchange may include means for obtaining an amount of resources assigned to a completed call, and said candidate zone selecting unit may include means for setting a higher value to an upper limit value of a number of selectable candidate radio communication zones with respect of said completed call as the amount of resources obtained by said exchange is increased.

Accordingly, since the number of candidate radio communication zones selected for a completed call is increased as the amount of resources assigned to the completed call is increased, a high level or complex service can be provided by using such resources and a handover of a completed call to which a large transmission capacity is assigned can be efficiently performed with a high probability.

Additionally, in the mobile communication systems according to the present invention, said exchange may include means for obtaining an amount of resources assigned to a completed call, and said candidate zone selecting unit may include means for setting a lower value to an upper limit value of a number of selectable candidate radio communication zones with respect to said completed call as the amount of resources obtained by said exchange is increased.

Accordingly, since it is avoided to select many candidate radio communication zones with respect to a completed call having a large amount of resources assigned thereto, an amount of process for setting a path with respect to the candidate radio communication zones and an increase of the amount of resources assigned to the path can be reduced.

Additionally, in the mobile communication systems according to the present invention, said exchange may include means for measuring its call incompletion rate of probability, and said candidate zone selecting unit may set a lower value to an upper limit value of a number of selectable candidate radio communication zones with respect to said completed call as the rate of probability measured by said exchange is increased.

Accordingly, since an amount of resources used for a handover is decreased as the rate of probability is increased, an increase of the rate of probability and an acceleration of a congestion can be reduced.

Additionally, in the mobile communication systems according to the present invention, said exchange may include means for measuring a level of its own congestion, and said candidate zone selecting unit may set a lower value to an upper limit value of a number of selectable candidate radio communication zones with respect to said completed call as the level of congestion measured by said exchange is increased.

Accordingly, since an amount of resources used for a handover is decreased as a level of the congestion is increased, an acceleration of the congestion and a delay of escape from the congestion can be reduced.

Additionally, the mobile communication systems according to the present invention may further comprise a moving speed measuring unit (121) which measures a speed of movement of said mobile station in which a completed call is originated, wherein said candidate zone selecting unit sets a higher value to an upper limit value of a number of selectable candidate radio communication zones with respect to said completed call as the speed measured by said moving speed measuring unit is increased.

When a speed of the mobile station is high and a handover is performed with respect to a radio communication zone other than the candidate radio communication zones, the probability of failure of the handover may be increased since the handover process of the radio channel cannot be completed in time as is in the conventional system. Accordingly, a probability of one of the candidate radio communication zones becoming a transferee is increased by increasing the upper limit value of the number of selectable candidate radio communication zones.

Additionally, the mobile communication systems according to the present invention may further comprise a transmission quality measuring unit (131) which measures a transmission quality at a predetermined frequency with respect to a completed call,
wherein said moment predicting unit predicts whether said mobile station in which said completed call is originated moves to one of the adjacent radio communication zones when the transmission quality is measured by said transmission quality measuring unit.

Accordingly, since the candidate zone selecting unit can start a process for selecting the candidate radio communication zones each time the transmission quality measuring unit (131) measures a transmission quality, the process can be performed in accordance with a transmission quality of the corresponding completed calls.

Additionally, the mobile communication systems according to the present invention may further comprise a transmission quality measuring unit which measures a transmission quality at a predetermined frequency with respect to a completed call,
wherein said moment predicting unit predicts that said mobile station in which said completed call is generated moves to one of the adjacent radio communication zones when the transmission quality of a current radio communication zone is less than a predetermined threshold value or when the transmission quality of one of the adjacent radio communication zones is greater than the predetermined threshold value.

Accordingly, since the candidate zone selecting unit can defer a start of the process for selecting the candidate radio communication zones until the transmission quality of the current radio communication zone measured by the transmission quality measuring unit (131) becomes less than the threshold value or until the transmission quality of an adjacent radio communication zone exceeds the previously set threshold value, an amount of process can be reduced as long as the threshold values are appropriately set to the zone structure.

Additionally, the mobile communication systems according to the present invention may further comprise a transmission quality measuring unit (141) which measures a transmission quality and a rate of change in the transmission quality at a predetermined frequency with respect to a completed call,
wherein said moment predicting unit predicts a moment when said mobile station in which said completed call is generated moves to one of the adjacent radio communication zones when the transmission quality of a current radio communication zone is less than a predetermined threshold value and based on the rate of change measured by said transmission quality measuring unit or when the transmission quality of one of the adjacent radio communication zones is greater than the predetermined threshold value and base on the rate of change measured by said transmission quality measuring unit.

Accordingly, since the candidate zone selecting unit can defer a start of the process for selecting the candidate radio communication zones until the transmission quality of the current radio communication zone measured by the transmission quality measuring unit (141) becomes less than the threshold value or until the transmission quality of an adjacent radio communication zone exceeds the previously set threshold value and the moment predicting unit performs a prediction based on the rate of change, an amount of process can be reduced as long as the threshold values are appropriately set to the zone structure. Additionally, a frequency to measure the transmission quality by the transmission quality measuring unit (141) can be decreased until the transmission quality of the current radio communication zone becomes less than the threshold value or until the transmission quality of the adjacent radio communication zone exceeds the threshold value.

Additionally, the mobile communication systems according to the present invention may further comprise a moving speed measuring unit (151) which measures a speed of movement of said mobile station in which a completed call is originated, wherein said moment predicting unit predicts a moment of movement of said mobile station to one of the adjacent radio communication zones to be earlier as the speed measured by said moving speed measuring unit is increased.

Accordingly, since the candidate zone selecting unit can select the candidate radio communication zones earlier as the speed of movement of the mobile station in which a completed call is originated is increased, the process for selecting the candidate radio communication zones and the process for acquiring a radio channel of the candidate radio communication zones can be performed with a high probability even if the radio communication zones are small or the speed of the movement of the mobile station is high.

Additionally, the mobile communication systems according to the present invention may further comprise a distance storing unit (161) in which a geographic distance between adjacent radio communication zones for all combinations of two radio communication zones in said plurality of radio communication zones, wherein said radio base station and said exchange comprise means for releasing a path formed by said candidate zone selecting unit, the path being formed for a candidate radio communication zone having the distance registered in said distance storing unit as a combination of radio communication zones corresponding to a transferee which is greater than a predetermined threshold value from among candidate radio communication zones selected by said candidate zone selecting unit.

Accordingly, since a previously formed path is released, if necessary, with respect to a candidate radio communication zone, which cannot become a transferee under the zone structure in a handover for a completed call, from among the candidate radio communication zones, an efficiency of use of the communication link provided between the radio base station and the exchange is increased.

Additionally, in the mobile communication systems according to the present invention, said exchange may include means for determining whether or not a transferee of said mobile station corresponds to one of the candidate radio communication zones selected by said candidate zone selecting unit in a process of a handover of the completed call so as to use a communication link set to the candidate radio communication zone for a call or a handover when a result of a determination is negative.

Accordingly, the previously set free candidate path is reserved without being released so that the reserved free candidate path can be used for a new call originated for other mobile stations or a handover for other mobile stations, which results in an increase in an efficiency of the system. Thus, a time for setting a new path can be saved.

Additionally, in the mobile communication systems according to the present invention, said exchange may include means for determining whether or not a transferee of said mobile station corresponds to one of the candidate radio communication zones selected by said candidate zone selecting unit in a process of a handover of the completed call so as to determine whether a method for releasing or a method for storing is applied to a communication link set to the candidate radio communication zone when a result of a determination is negative.

Accordingly, all of the free candidate paths are not registered, but some of the free candidate paths are released when a ratio of the free candidate paths to be registered to all of the free candidate paths is large so as to prepare for a use for other purposes. Thereby, an occurrence of a condition can be prevented in which too many free candidate paths are registered which condition influences a regular path setting operation.

Additionally, in the mobile communication systems according to the present invention, said exchange may include means for determining whether to acquiring a radio channel after a completion of a setting of a communication link by said candidate zone selecting unit or to perform a handover without waiting for the completion of the setting of the communication link when a handover request is generated by said mobile station during a setting operation of the communication link by said candidate zone selecting unit.

Accordingly, when a request for a handover is generated while the wire link is being set, a selection can be made whether to use the method according to the present invention or a conventional method. Thus, a conventional method can be used when a path setting operation according to the conventional method is faster than the method according to the present invention.

Additionally, in the mobile communication systems according to the present invention, said exchange may predict a time when a setting of the communication link is completed by said candidate zone selecting unit and a time when a handover request is generated, and when it is determined that the time when the setting of the communication link and the time when the handover request is generated are short, said exchange performs a handover and otherwise said exchange performs a setting of the communication link prior to a handover.

Although a setting of a wire path prior to a handover is to reduce a time period required for the handover, there may be a case in which the time period is not reduced. Thus, when a time for completing the setting operation of the communication link is earlier than the time of occurrence of the handover, the system is switched to use a conventional method since this corresponds to the above-mentioned case.

Additionally, in the mobile communication systems according to the present invention, said exchange may not perform a setting of a communication link by said candidate zone selecting unit when a level of use of its own resources exceeds a predetermined threshold value.

That is, the ratio of the actually used band to the communication band assigned to a path is calculated, and a means is provided for stopping a setting of a communication link prior to a handover based on the method according to the present invention when the ratio exceeds the threshold value. Additionally, a CPU or a radio channel may be used as resources of the exchange when the exchange monitors a rate of use of the radio channel. In such a case, the exchange may monitors a rate of use of the CPU or the rate of use of the radio channel so that the setting of the communication link is stopped prior to a handover based on the method according to the present invention when the ratio exceeds the threshold value. Thereby, the limited resources can be efficiently used.

Other objects, features and advantages of the present invention will become more apparent from the following detailed description when read in conjunction with the accompanying drawings.

BRIEF DESCRIPTION OF THE DRAWINGS

FIG. 7 is an illustration indicating a structure of a path status management table;

FIG. 11 is an illustration indicating a structure of a moving pattern table;

FIG. 13 is an illustration indicating a structure of an adjacent cell table;

FIG. 19 is an illustration indicating a structure of a cell distance table;

FIG. 25 is an illustration indicating a structure of a free candidate path management process;

FIG. 27 is an illustration of a structure of a path status management table;

DETAILED DESCRIPTION OF THE PREFERRED EMBODIMENTS

A description will now be given in detail, with reference to the drawings, of modes of carrying out the present invention.

Figure 3:
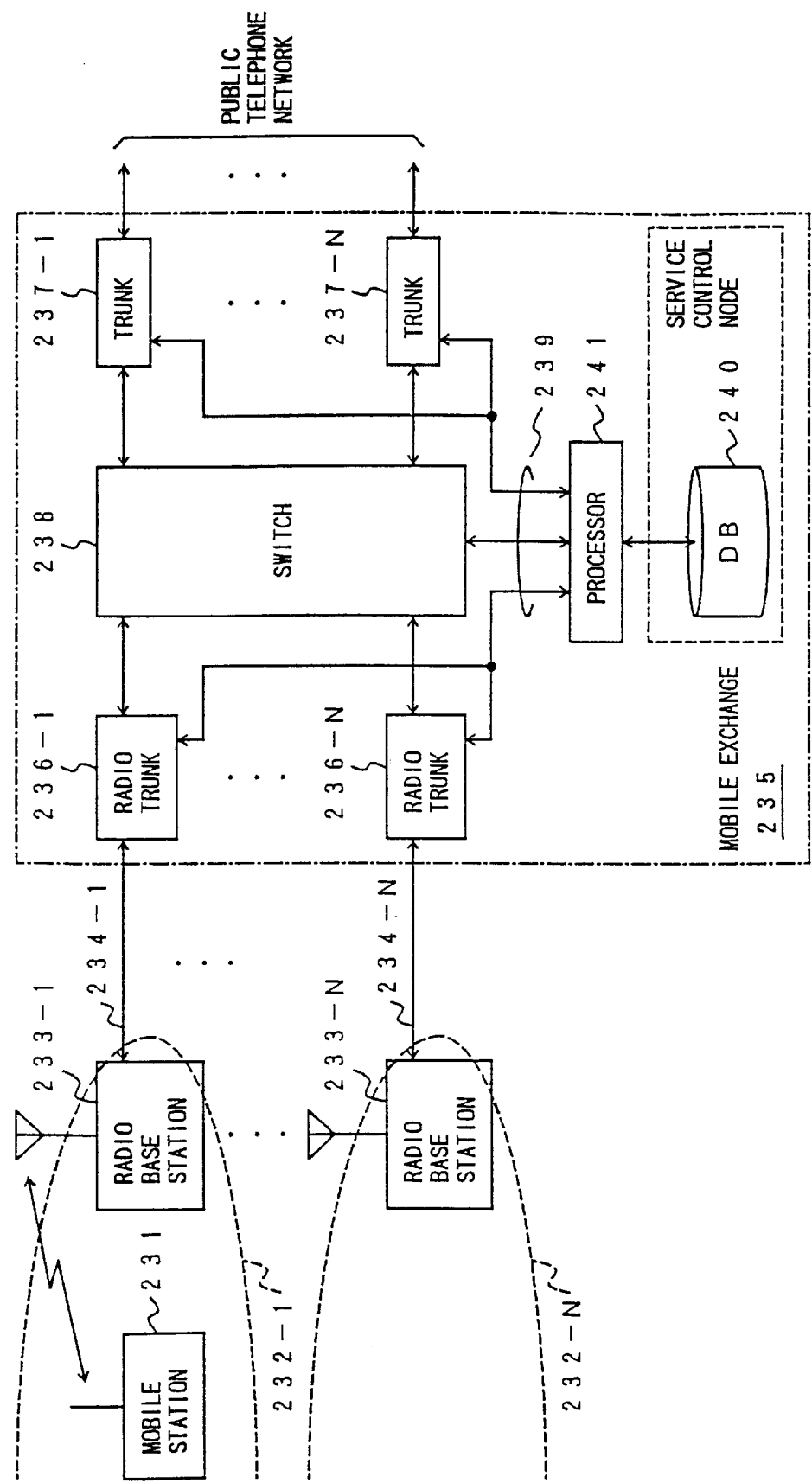
FIG. 3 is an illustration of a mobile communication system according to a first embodiment of the present invention.

FIG. 3 is an illustration of a mobile communication system according to a first embodiment of the present invention.

In FIG. 3, radio base stations 233-1 to 233N, each of which forms respective one of a plurality of cells 232-1 to 232-N in which a mobile station 231 can be located, are connected to corresponding paths in a mobile exchange 235 via transmission paths 234-1 to 234-N. The mobile exchange 235 is connected to a public telephone network.

The mobile exchange 235 comprises radio trunks 236-1 to 236-N, trunks 237-1 to 237-N, a switch 238, a processor 241. The radio trunks 236-1 to 236-N are connected to the radio base stations 233-1 to 233N via the transmission paths 234-1 to 234-N, respectively. The trunks 237-1 to 237-N are provided between the radio trunks and the public telephone network on an each line basis. The switch 238 has a plurality of ports each of which is connected to a respective one of the radio trunks 236-1 to 236-N and the trunks 237-1 to 237-N. The processor 241 is connected to the switch 238 via a communication link 239, and includes a database (DB) 240 in which station information is stored.

Figure 1:
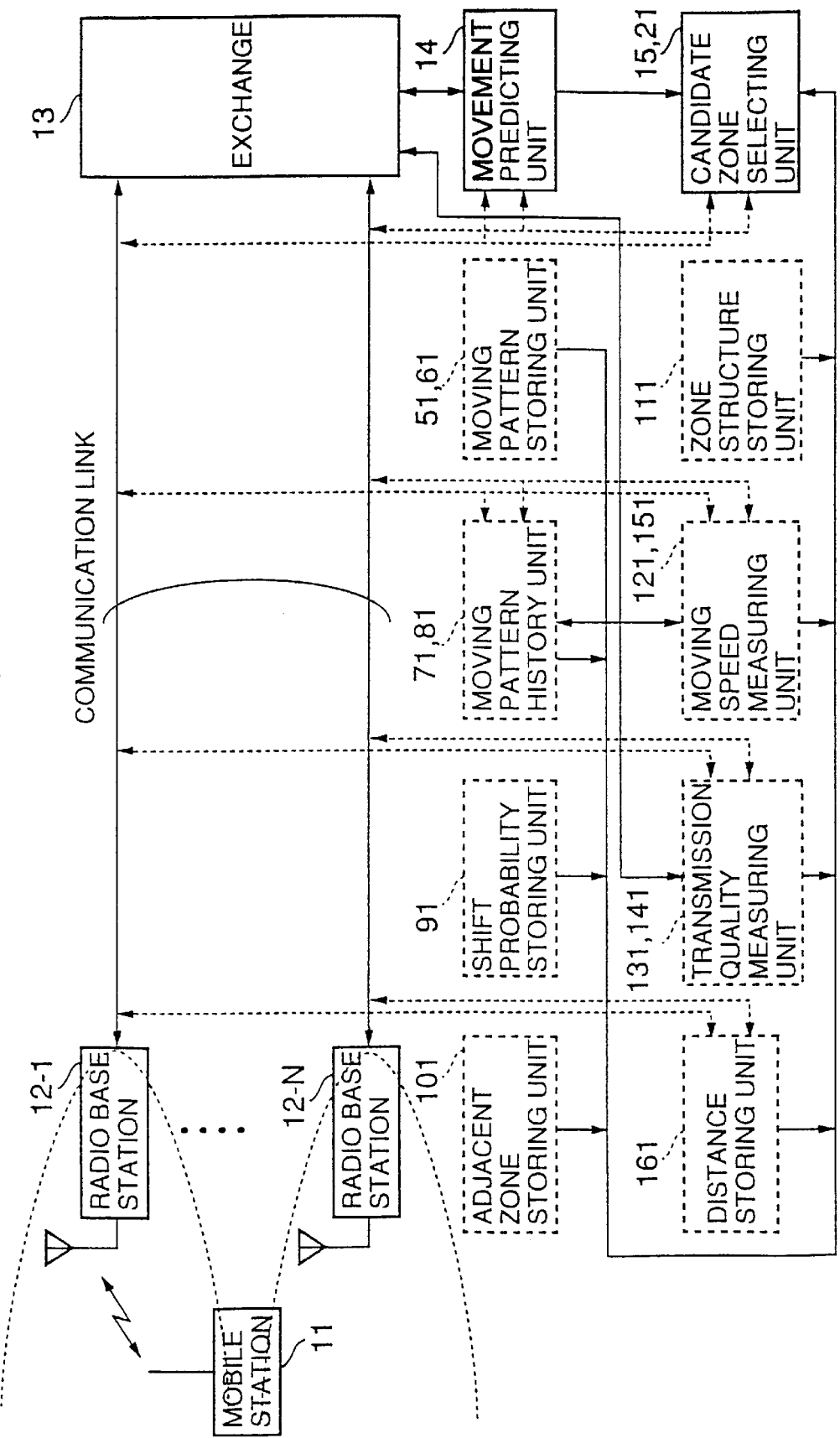
FIG. 1 is a block diagram for explaining a principle of a first embodiment of the present invention.
Figure 2:
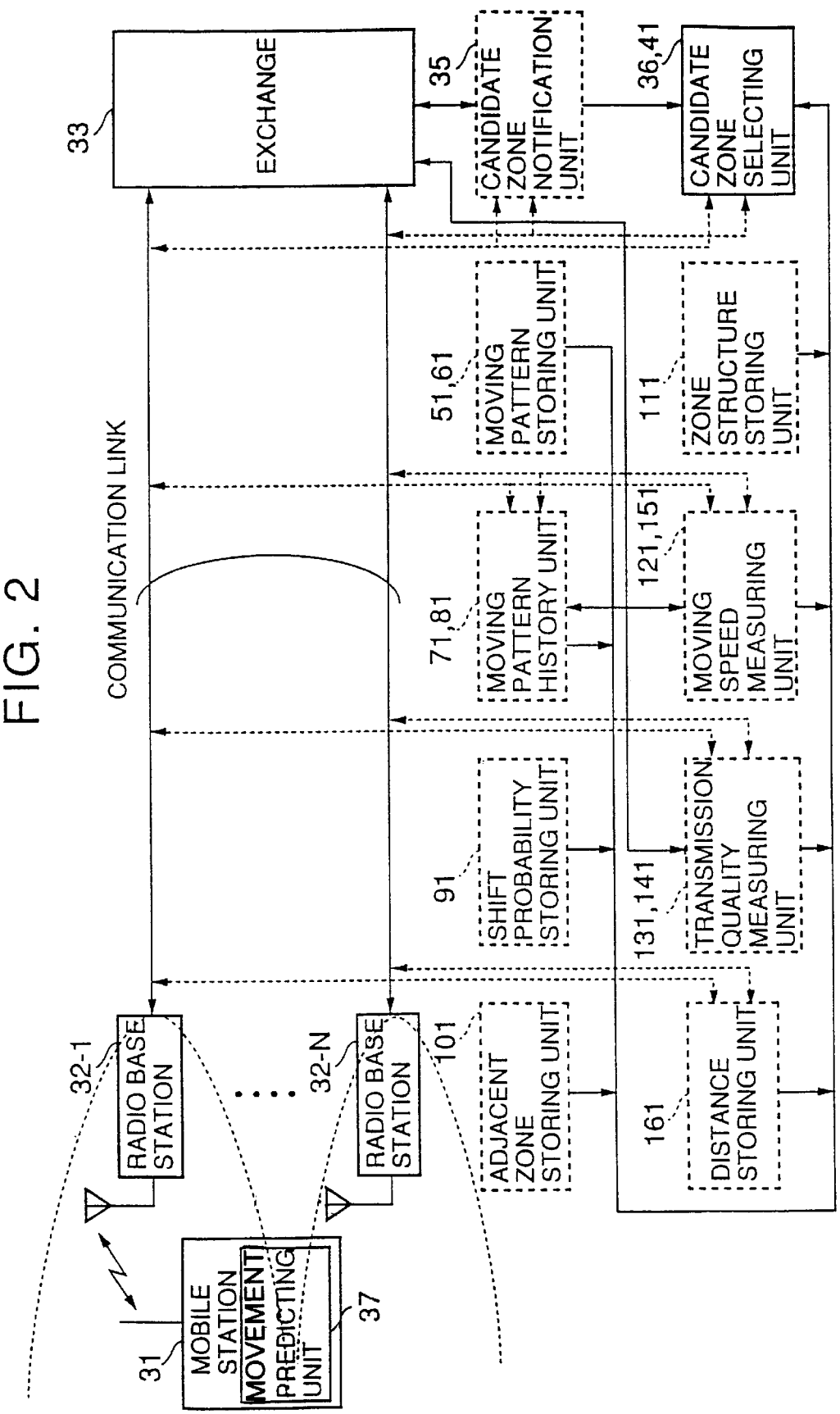
FIG. 2 is a block diagram for explaining a principle of a second embodiment of the present invention.

It should be noted that the correspondence between the present embodiment and the block diagrams shown in FIGS. 1 and 2 is as follows. That is, the mobile station 231 corresponds to the mobile station 11 or 31 and the moment predicting means 37; the radio base stations 233-1 to 233-N correspond to the radio base stations 12-1 to 12-N or 32-1 to 32-N; the mobile exchange 235 corresponds to the exchange 13 or 33; the database 240 corresponds to the moving pattern storing means 51 or 61, the moving pattern history means 71 or 81, the shift probability storing means 91, the adjacent zone storing means 101, the zone structure storing means 11 and the distance storing means 161; the processor 241 corresponds to the moving speed measuring means 121 or 151, the transmission quality measuring means 131 or 141, the moment predicting means 14, the candidate zone selecting means 15 and 21 or 36 and 41 and the candidate zone notification means 35.

Figure 4:
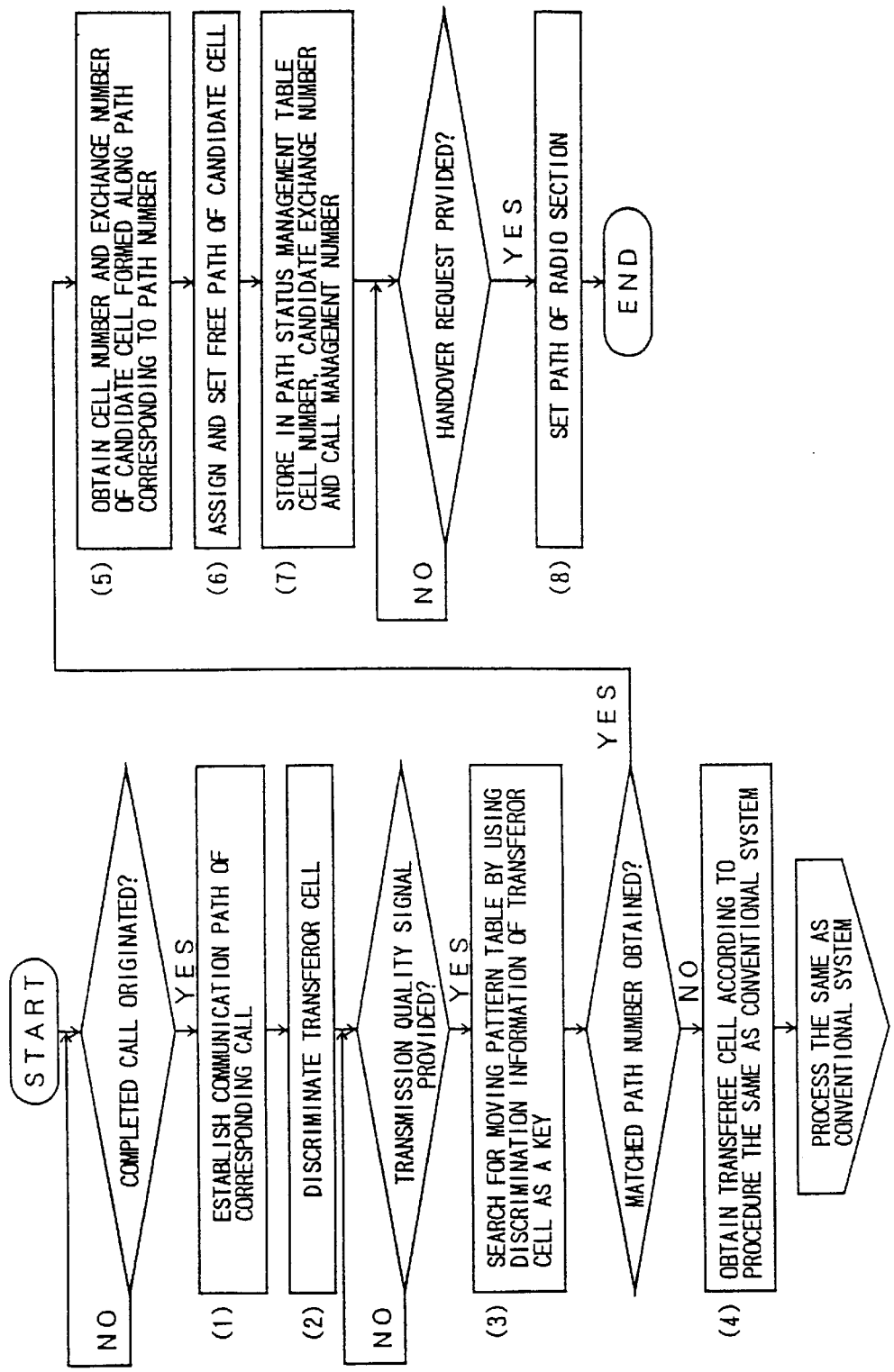
FIG. 4 is a flowchart of an operation of the first embodiment.
Figure 5:
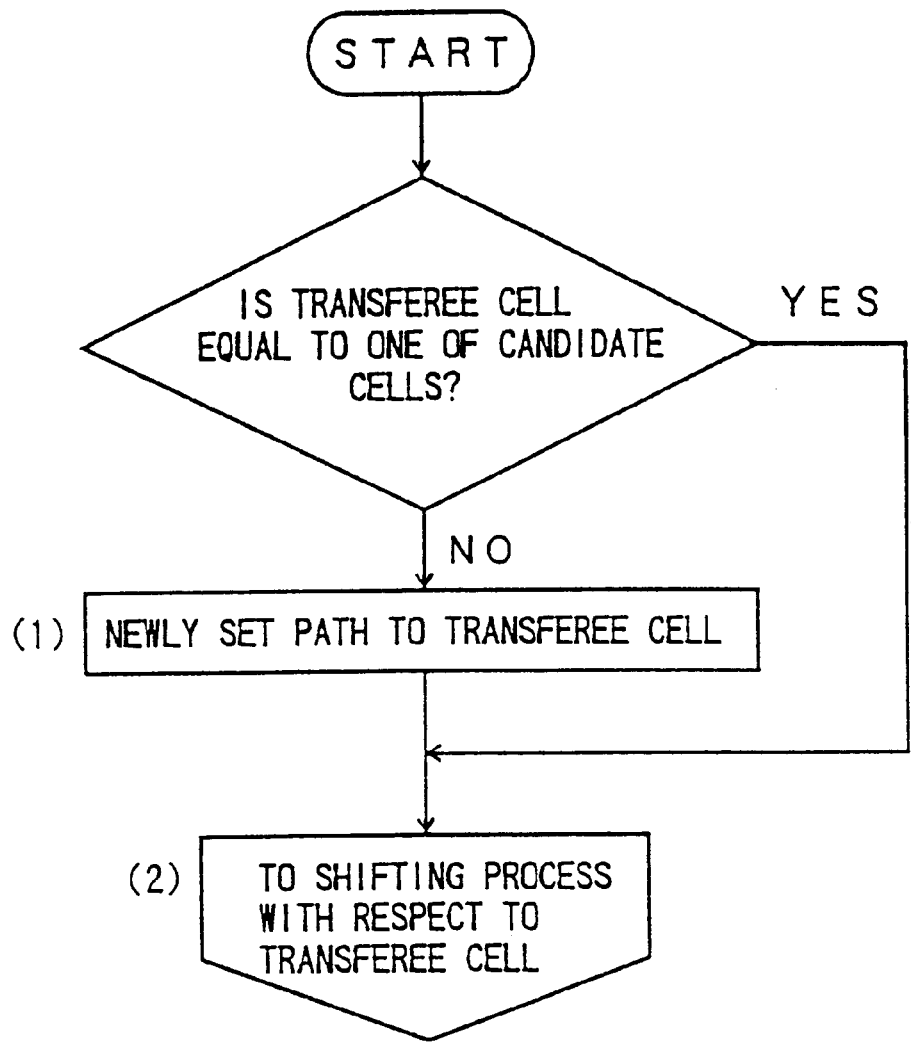
FIG. 5 is a flowchart of a process procedure of a handover performed in the first embodiment.

FIG. 4 is a flowchart of an operation of the present embodiment. FIG. 5 is a flowchart of a process procedure of a handover performed in the present embodiment. A description will now be given, with reference to FIGS. 3 to 5, of an operation of the first embodiment according to the present invention.

Figure 6:
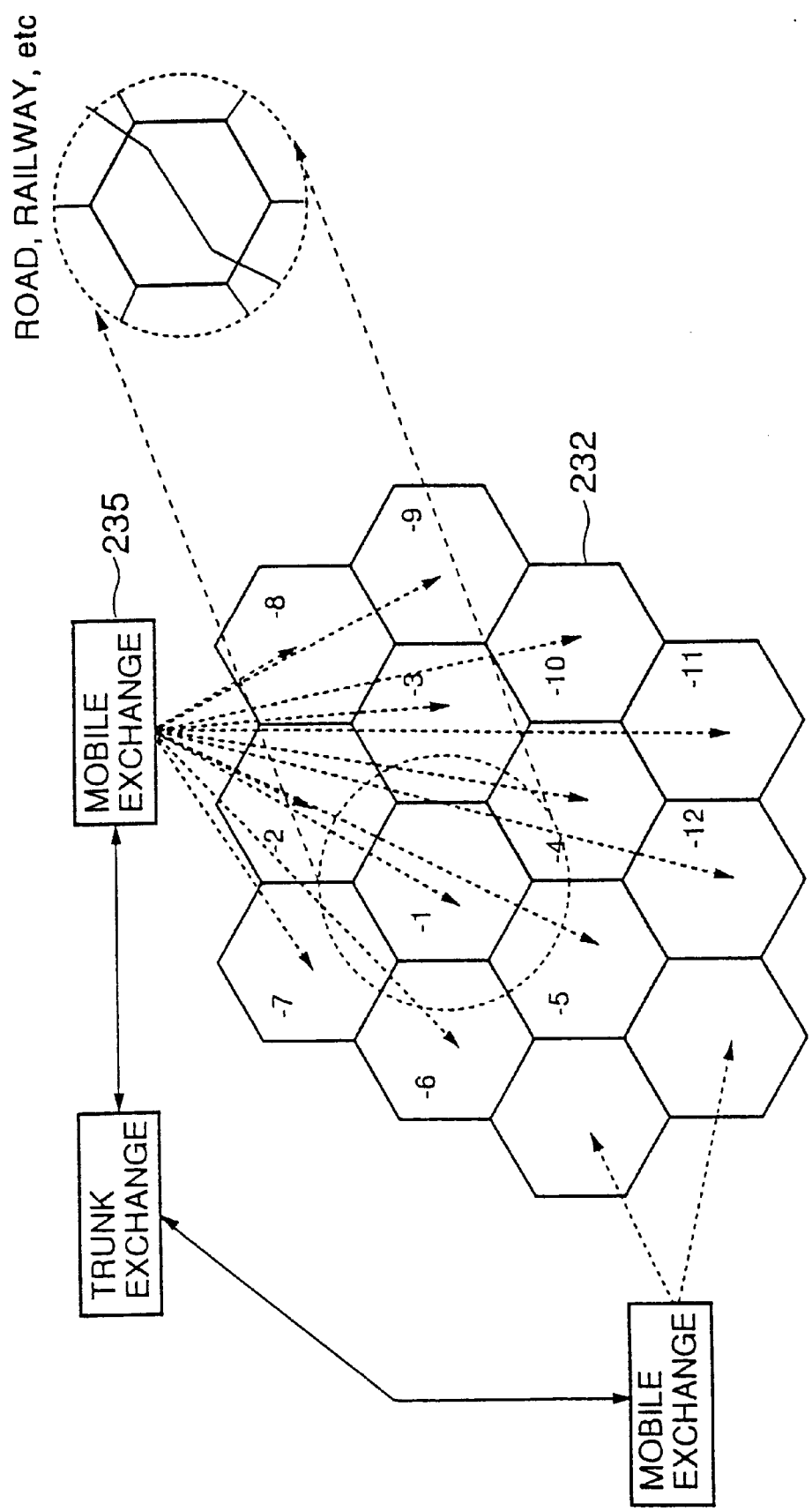
FIG. 6 is an illustration for indicating zone structure.

The radio base stations 233-1 to 233-N form the cell 232-1 to 232-N in which the mobile station 231 can be located as shown in FIG. 6 under a control of the mobile exchange 235. The radio base stations 233-1 to 233-N assign a radio channel to a call originated by a mobile station (hereinafter, indicated by the reference numeral 231 for the sake of simplification) located in these cells in accordance with a predetermined procedure in cooperation with the mobile exchange 235.

Additionally, in the mobile exchange 235, the processor 241 performs the above-mentioned call process. Upon recognition of the call being a completed call, the processor 241 establishes a communication path with a public telephone network or other radio channels connected to a transmitter or a receiver (FIG. 4-(1)).

It should be noted that, in such a call process, the processor 241 exchanges control information with the radio base stations 233-1 to 233N via the communication link 239, the radio trunks 236-1 to 236-N and transmission paths 234-1 to 234-N. Additionally, the processor 241 exchanges the control information with the public telephone network via the communication link 239 and the trunks 237-1 to 237-N. Further, the radio trunks 236-1 to 236-N interfaces between the above-mentioned communication path and the radio channel (radio path) which is connected through the transmission paths 234-1 to 234-N and the radio base stations 233-1 to 233-N. However, the function to interface the radio trunks 236-1 to 236-N and the trunks 237-1 to 237-N is a known technique disclosed, for example, in the following documents, and thus the description thereof will be omitted.

1. Interface of Radio Frequency Trunk (standard for the PHS)

Interface Layer 2 Specification between Public Base Station of Simple-Type Portable Telephone System and Digital Network JT-Q.921-b, Telegram and Telephone Technology Committee (TTC)

Interface Layer 3 Specification between Public Base Station of Simple-Type Portable Telephone System and Digital Network JT-Q.931-b, Telegram and Telephone Technology Committee (TTC)

Interface PHS Service Control Procedure between Public Base Station of Simple-Type Portable Telephone System and Digital Network JT-Q.922-a, Telegram and Telephone Technology Committee (TTC)

2. Interface of Trunk 237

ITU-TQ.7000, No.7 Signal System

Mobile Communication Application (MAP) Signal System of Interface (DMNI) between PDC Digital Mobile Communication Nodes, Telegram and Telephone Technology Committee (TTC)

3. Interface between Base Station and Mobile Station (PHS)

Second Generation Codeless Telephone system Standards (RCR STD-28), Version No.1, Radio System Development Center The processor 241 has a path status management table 250, with respect to each completed call, as the station information which is used for storing a unique call management number, a candidate cell number, a candidate exchange number, a candidate path number and candidate path status information. The call management number designates each completed call. The candidate cell number designates a cell (hereinafter referred to as a candidate cell), which is assigned as a candidate of a cell to which the mobile station is moved in accordance with a procedure described later, prior to starting a handover. The candidate exchange number designates a mobile exchange (hereinafter referred to as a candidate exchange) which controls the radio base station forming the candidate cell. The candidate path number designates a path (hereinafter referred to as a candidate path) which is assigned in accordance with a procedure described later among the paths connecting the candidate exchanges and the candidate cells. The candidate path status information indicates a status of the candidate path.

Figure 8:
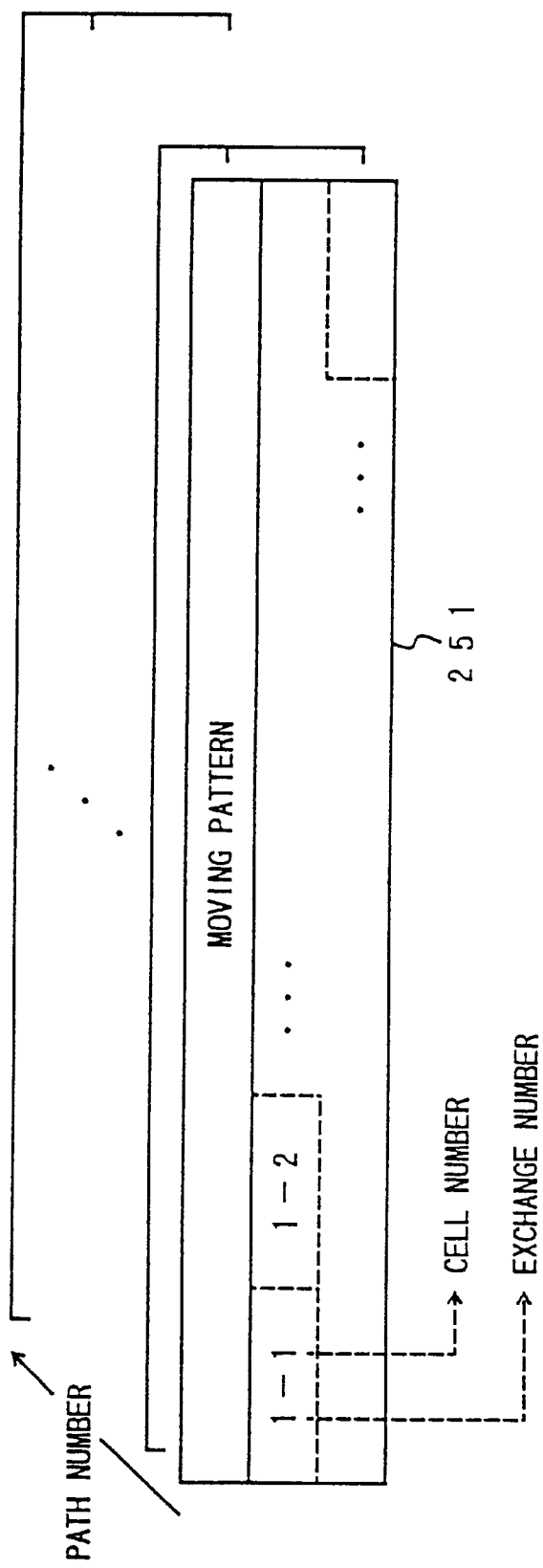
FIG. 8 is an illustration indicating a structure of a moving pattern table.

Additionally, as shown in FIG. 8, the database 240 has a moving pattern table 251, as station information, in which a permutation of combination of a cell number and an exchange number is registered, the cell number designating each cell formed along a path with respect to a unique path number which designates a path along which the mobile station 231 is moving along a railway or a road (limited to major ones for the sake of simplification), the exchange number designating a mobile exchange controlling a radio base station forming the cell. The mobile station 231 measures an electric field intensity of each cell 231-1 and the adjacent cells 232-2 to 232-N in accordance with a predetermined period when the mobile station 231 is located in the cell 231-1 and when a call originated in the mobile station 231 becomes a completed call. The mobile station then transmits a transmission quality notification signal including the measured electric field intensity to the radio base station 233-1.

On the other hand, in the mobile station 235, when the processor 241 recognizes the above-mentiones completed call in accordance with a procedure of a known call process, the processor 241 establishes a communication path with respect to the call (FIG. 4-(1)), and discriminates a cell (hereinafter referred to as a transferor cell) in which the mobile station 231 is located (FIG. 4-(2)). Additionally, upon recognition of the transmission quality notification signal transmitted by the mobile station 231 as mentioned above, the processor 241 performs a search operation with respect to the moving pattern table 251 by using discrimination information of the transferor cell as a key (FIG. 4-(3)). The processor obtain the transferee cell in accordance with a procedure similar to that of a conventional system when a path number matching the key cannot be obtained.

On the other hand, when a path number is obtained, the processor 241 obtains a candidate cell (assumed to be the cell 232-2 for the sake of simplification) formed along a path (indicated by an enlarged view within a dotted line frame of FIG. 6) registered in the moving pattern table 251 in accordance with the obtained path number so as to obtain the cell number and the exchange number of the candidate cell (FIG. 4-(5)).

Additionally, the processor 241 assigns an available path in the cell indicated by the cell number and the exchange number to the corresponding call by cooperating with a radio channel setting control performed by the radio base station 233-2 (FIG. 4-(6)). Thereafter, the processor 241 stores a call management number, which is assigned to the corresponding completed call during a call process, in an empty area of a path status management table 250 together with the cell number and the exchange number and the candidate path number and the candidate path status information (assumed to indicate that the corresponding candidate path was set and a zone occupied by setting for the sake of simplification) (FIG. 4-(7).

Then, the processor 241 sets a path (channel) of the radio section after waiting for receipt of a handover request (FIG. 4-(8).

It should be noted that it is assumed that a single path is designated for the above-mentioned candidate path for the sake of simplification.

Additionally, since the procedure for processes performed by the radio base station 233-2 and the processor 241 is the same as a procedure for setting a path of a transferee cell in a handover process in the conventional system, a description thereof will be omitted.

When the mobile station 231 is moved to the cell 232-N, the mobile station 231 and the radio base stations 233-1 to 233-N cooperate to perform a radio channel setting control with respect to the handover.

In such a radio channel setting control process, the processor 241 determines whether or not the transferee cell is the candidate cell (cell 232-2) based on the procedure of the radio channel setting control. If the result of the determination is negative, the processor 241 newly sets an available path of the transferee cell based on a procedure of a call process similar to that of the conventional system (FIG. 5-(1)). However, if the result of the determination is affirmative, such a setting of the path is omitted.

It should be noted that although the path for the radio section to be connected to the path is set by the radio base station 233-2 based on the procedure of a radio channel setting control similar to that of the conventional system, such a procedure of the process (FIG. 5-(2)) is the same as that of the conventional system and a description thereof will be omitted.

As mentioned above, according to the present embodiment, the path used for communication of the mobile station in the cell adjacent to the cell where the mobile station is presently located is reserved and established prior to a time when the mobile station actually moves to the adjacent cell. Thus, a period of time necessary for radio channel setting control and the call process started for achieving a handover at that time can be greatly reduced as compared to that of the conventional system.

It should be noted that, in the present embodiment, although the candidate cell is selected by taking a correlation between the permutation of the cells formed along a railway or a road and a single cell in which the mobile station is located, the selection of the candidate cell may be performed based on a direction of movement of the mobile station which is detected from a rate of change in the measured electric field intensity when the cell in which the mobile station is located has not been registered in the moving pattern table 251 or the moving pattern table 251 itself is not provided.

Additionally, in the present embodiment, although the candidate cell is selected by taking a correlation between the permutation of the cells formed along a railway or a road and a single cell in which the mobile station is located, permutations of the cells which were considered to be transferees in the handover procedures performed a plurality of times may be obtained as a history, and certainty of the candidate cell being actually turned into the transferee cell may be increased by taking a correlation with the history.

Further, in the present embodiment, although the candidate cell is selected by a process for referring the moving pattern table 251, a criterion of the selection may be changed, if necessary, based on a result of prediction when it can be predicted with a high degree of certainty as to whether or not the mobile station that is a candidate for handover is moving along a road or a railway.

Additionally, in the present embodiment, although a single cell is determined to be the candidate cell, the number of candidate cells may be a plurality if a decrease in network resource efficiency can be allowed and if a release of all of the cells, which cannot continuously be the candidate at a time when the handover is completed or the call is completed, is allowed.

Figure 9:
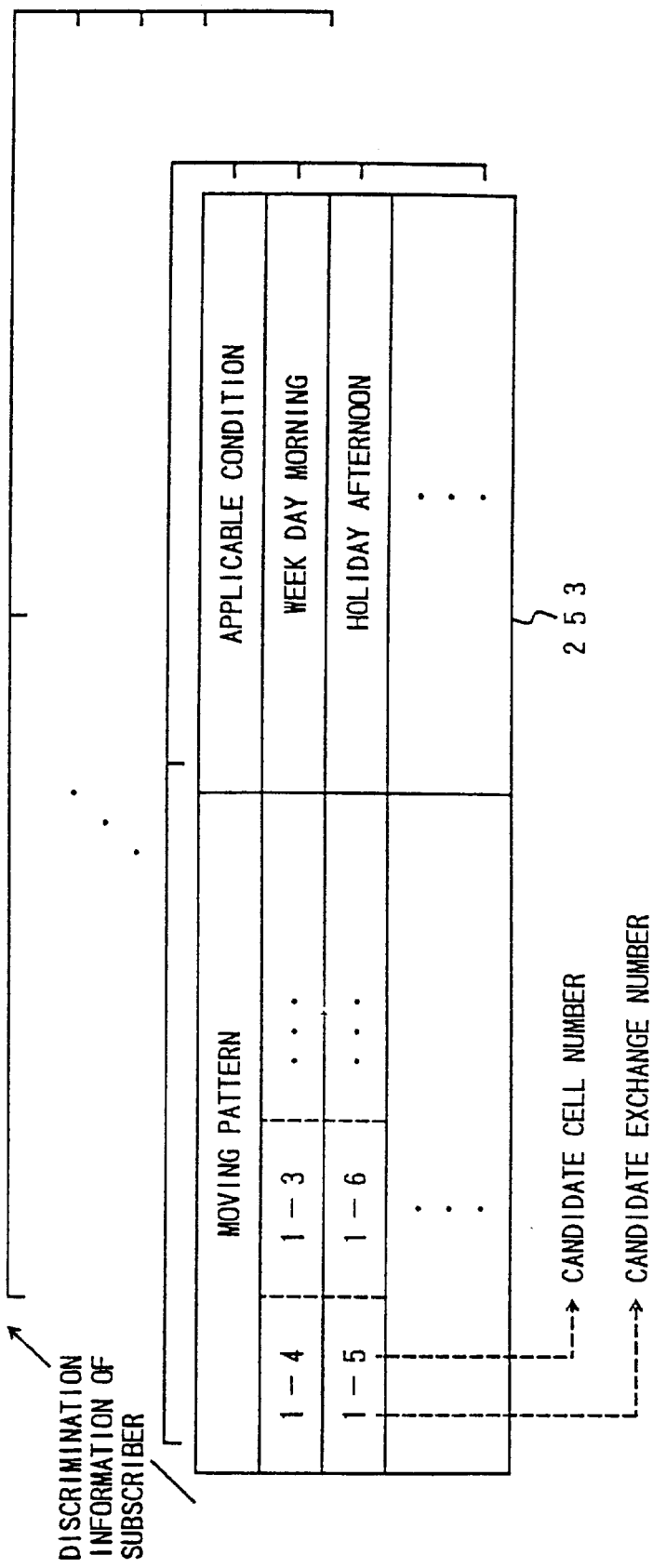
FIG. 9 is an illustration indicating a structure of a subscriber responsive moving pattern table.

Further, in the present embodiment, although a train of cells that are formed along a road or railway are registered in the moving pattern table 251, a subscriber responsive moving pattern table 253 shown in FIG. 9 may be alternatively applied in which a train of cells indicated by a combination of the candidate exchange number and the candidate cell number are registered for each mobile station. The train of cells is announced by a subscriber of each mobile station, and is registered for each applicable condition such as a time range, if necessary.

A description will now be given of a second embodiment of the present invention. A difference between the present embodiment and the first embodiment is in a dispersion of functions to the mobile station 231, the radio base stations 233-1 to 233-N and the processor 241.

A description will now be given, with reference to FIG. 3, of an operation of the present invention.

The database 240 has the path status management table 250 and the moving pattern table 251 as station information as is the same with the first embodiment of the present invention.

In the mobile exchange 235, upon recognition of a completed call based on the procedure of a call procedure, the processor 241 discriminates a transferor cell in which the mobile station 231 is located. Then, the processor 241 applies a search process to the moving pattern table 251 by using the discrimination information of the transferor cell as a key. If a path number matching the key cannot be obtained, the candidate cell may be detected by other methods (for example, a method using subscriber responsive moving pattern table 253). If the candidate cell cannot be obtained by other methods, a handover may be performed in accordance with a procedure similar to that of the conventional system (for example, by obtaining a transferee cell by using a threshold value of an electric field intensity).

However, if a path number is obtained, the processor 241 obtain a path registered in the moving pattern table 251 in response to the obtained path number so as to obtain the adjacent candidate cell located along the path.

Additionally, the processor 241 announces all of the thus obtained candidate cells to the mobile station 231 via the radio base station 233-1.

On the other hand, upon recognition of the call originated in the cell 232-1 being turned to a completed call, the mobile station 231 measures an electric field intensity with respect to the cell 232-1 and the adjacent cells 232-2 to 232-7 at a predetermined frequency period. Then, when the candidate cell is announced by the mobile exchange 235 as mentioned above, all of the candidate cells are reserved.

Additionally, the mobile station 231 sends a handover request to the radio base station 233-1 in a manner similar to the conventional system when a reference value of the electric field intensity required for the transferee of handover is provided beforehand and when an electric field intensity of a cell other than the candidate cells reserved during the above-mentioned process of measurement of the electric field intensity exceeds the reference value.

However, when the reference value of the electric field intensity required for predicting the transferee of handover is provided beforehand and when an electric field intensity of one of the candidate cells exceeds the reference value, the mobile station 231 sends a path setting request including the discrimination information of that cell prior to sending the handover request. On the other hand, in the mobile exchange 235, the processor 241 performs a handover process in accordance with a procedure similar to that of the conventional system when the above-mentioned handover request is recognized.

However, when the path setting request is recognized, the processor 241 sets a path in the candidate cell indicated in the path setting request, and assigns the path to a corresponding call in a manner similar to that of the first embodiment.

It should be noted that an operation after the mobile station 231 has moved to the cell 232-2 (that is, an operation of the mobile station 231 for sending the handover request) is the same as that of the first embodiment, and a description thereof will be omitted.

As mentioned above, according to the present embodiment, since a timing of setting of a path in the previously selected candidate cell is recognized under a control of the mobile station 231, loads of processes related to the recognition is dispersed to mobile stations which are located in the cells 232-1 to 232-N and are in a communication state. Thus, a load applied to the radio base stations 233-1 to 233-N and processor 241 is greatly decreased as the number of completed calls present at the same time is increased.

It should be noted that, in the present embodiment, the candidate cell may be selected when the process recognizes a completed call in accordance with a procedure of the call process. Additionally, the candidate cell may be selected before a call is turned to a completed call, that is, during a call setting procedure, and the discrimination information of the candidate cell may be added to a call setting signal so as to be sent to the mobile station.

A description will now be given of a third embodiment of the present invention.

A difference between the third embodiment and the first and second embodiment of the present invention is that the contents of the moving pattern table 251 are automatically updated in accordance with a process described below.

Figure 10:
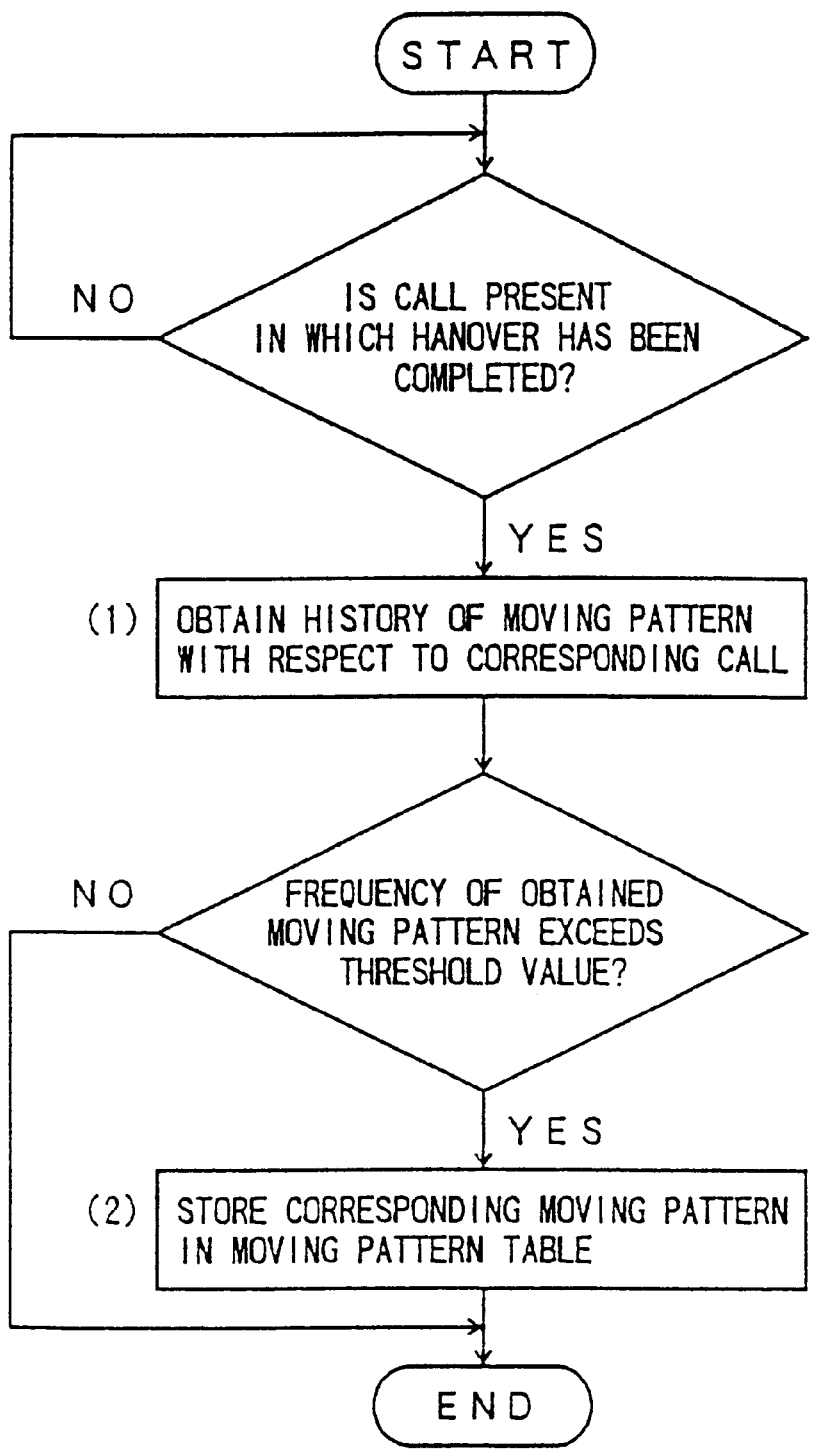
FIG. 10 is a flowchart of an operation of a mobile communication system according to a third embodiment of the present embodiment.

FIG. 10 is a flowchart of an operation performed by a mobile communication system according to the third embodiment of the present embodiment. A description will now be given, with reference to FIGS. 3 and 8 to 10, of the operation of the present embodiment.

Information of predetermined default values is registered in the moving pattern table 251.

In the mobile exchange 235, the processor 241 obtains a history of a moving pattern which comprises a transferee cell and a single transferor cell or a train of transferor cells which has or have been used for a communication prior to the handover every time the handover is completed for each completed call. Further, the processor 241 stores in the moving pattern table 251 a moving pattern having a frequency greater than a predetermined threshold value from among moving patterns obtained as the history (FIG. 10-(2)).

That is, a train of cells having a certainty to be a transferee can be increased in accordance with an actual path along which the mobile station moves is stored in the moving pattern table 251.

Accordingly, in the present embodiment, a probability of use of a path in a communication in the transferee cell is increased while the system flexibly adapts to a distribution or state of an amount of traffic, the path being set prior to a time when each mobile station moves to a range of the adjacent cell.

It should be noted that, in the present embodiment, the moving pattern history is commonly obtained for each completed call, and the moving pattern table 251 used for the completed call is updated based on the history. However, when the probability is required to be further increased, such history may be obtained in connection with other attributes of the mobile station (if necessary, a time slot or a service class of the mobile station) so that the corresponding pattern table is individually updated for each attribute, and the candidate cell may be selected in accordance with a reference to the moving pattern table having such attribute, as a key, obtained for the completed call.

A description will now be given of a fourth embodiment of the present invention.

The difference between the fourth embodiment and the above mentioned third embodiment is that the subscriber responsive moving pattern table 253 is replaced with a moving pattern table 254 shown in FIG. 11, and the processor 241 specifies a candidate cell in accordance with the moving pattern table 254.

Figure 12:
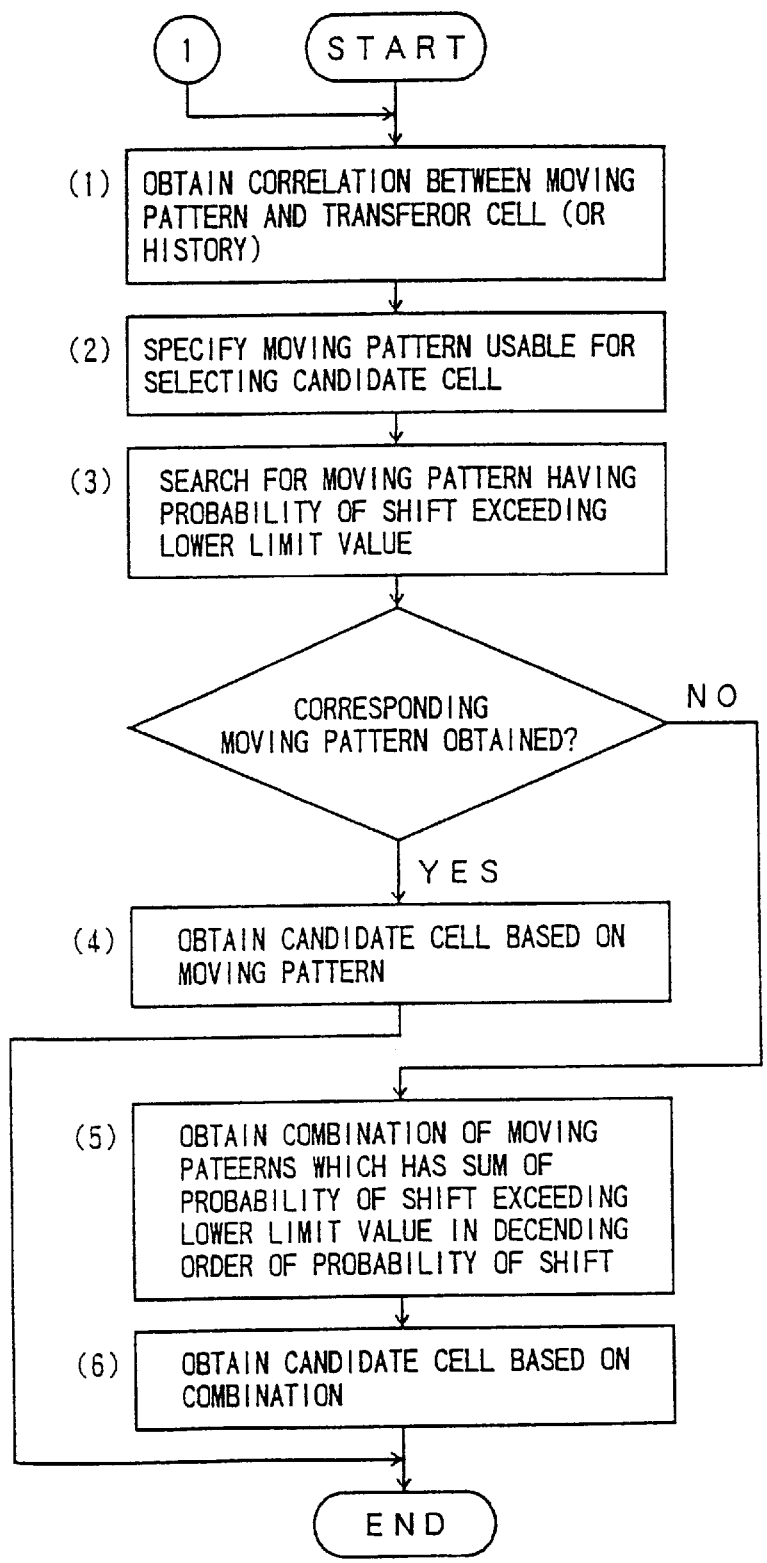
FIG. 12 is a part of a flowchart of an operation of a fourth embodiment according to the present invention.

FIG. 12 is a flowchart of an operation of a mobile communication system according to the fourth embodiment of the present invention.

A description will now be given, with reference to FIGS. 3, 11 and 12, of the operation of the present embodiment.

In the moving pattern table 254, as shown in FIG. 11, with respect to each moving pattern, a path along which the mobile station is movable and a probability (hereinafter referred to as a moving probability) which is previously obtained based on a distribution of mobile stations in the path and that is applicable as a reference of selection of the candidate cell are stored correspondingly to a train of cell numbers indicating the corresponding moving pattern similar to the subscriber responsive moving pattern table 253.

The processor 241 refers to the moving pattern table 254 when the candidate cell is selected as is in the above-mentioned embodiments so as to specify one or a plurality of moving patterns used for selecting the candidate cell (FIG. 12-(1)) by taking a correlation with a transferor cell (or a history of the transferor cell) in which a mobile station having a completed call is located from among moving patterns stored in the moving pattern table 254 (FIG. 12-(2)).

Additionally, the processor 241 searches for a moving pattern having the moving probability exceeding a predetermined lower limit value stored in the moving pattern table 254 from among the thus specified moving patterns (FIG. 12-(3)). Accordingly, when a moving pattern is obtained by the search, the processor 241 obtains the candidate cell in accordance with the moving pattern (may be singular or plural) (FIG. 12-(4))).

However, if such a moving pattern cannot be obtained, the processor 241 obtains a combination of moving patterns of which sum of moving probabilities exceeds the lower limit value in a descending order (FIG. 12-(5)). Further, the processor 241 obtains a candidate cell based on each moving pattern included in the combination (FIG. 12-(6)).

As mentioned above, in the present embodiment, the moving pattern having a high moving probability has a priority for a selection of the candidate cell. Thus, a probability that one of the candidate cells coincides with the transferee cell is increased as compared to a case in which the moving pattern is specified irrespective of such a probability.

It should be noted that, in the present embodiment, although the information stored in the moving pattern table 254 is not updated, the information may be updated in accordance with a history adapted to an actual movement of the mobile station similar to the third embodiment of the present invention.

Additionally, in the present embodiment, as shown in FIG. 11, although the moving pattern table 254 is used which is adapted to an applicable condition and provides a moving probability for each moving pattern, the moving pattern table is not limited to the disclosed type. That is, for example, if a correlation with the transferor cell (or a history of the transferor cell) in which the mobile station having the completed call is located can be obtained, and is the candidate cell can be obtained by referring to cells in a descending order of the probabilities, the type of the moving pattern table may be a type which provides a combination of a moving pattern and a probability which are previously correlated to each other to the cells in the current cell and all of the candidate cells, or may be of any other types.

A description will be given of a fifth embodiment of the present invention.

A difference between the fifth embodiment and the third and fourth embodiments is that the processor 241 limits a cell in which a path is to be formed from among the obtained candidate cells in accordance with the following procedure.

A description will now be given, with reference to FIGS. 3 and 13, of an operation of the fifth embodiment according to the present invention.

The data base 240 includes an adjacent cell table 255 in which all combinations of two cells (hereinafter each of the two cells is referred to as adjacent cell) adjacent to each other are previously registered. Hereinafter, it is assumed that the adjacent cell is indicated by a pair of cell number which indicates each adjacent cell and an exchange number which indicates a mobile exchange controlling a radio base station forming the adjacent cell.

Similar to the third and fourth embodiments, the processor 241 obtain a single candidate cell or plurality of candidate cells, and searches for the adjacent cell table 255 by using a pair of the cell number of a transferee cell and the number of the exchange as a key so as to select all of the adjacent cells which are adjacent to the transferee cell.

Additionally, the processor 241 obtains the candidate cell by eliminating the candidate cells which do not correspond to thus selected adjacent cells from among all of the candidate cells. The processor 241 sets a path in each of the remaining candidate cells in a manner similar to that of the third and fourth embodiments.

As mentioned above, in the present embodiment, since the candidate cell in which a path is to be set prior to a handover is positively limited to the adjacent cell which is adjacent to the cell in which the mobile station is located, the handover can be effectively achieved with a high certainty even if an error exists in a moving pattern obtained based on a history in the third or fourth embodiment.

It should be noted that, in the fifth embodiment, the candidate cell is selected based on the moving pattern, a moving probability and a cell structure, and a direction of movement of the mobile station in which the completed call is originated is not referred to when the candidate cell is selected. However, a technique, in which a direction of movement of a mobile station is obtained so as to select a candidate cell having a high certainty to be a transferee based on the direction of movement, may be applied to the present embodiment. Such technique is as follows.

a) To select as a candidate cell a cell in which a maximum rate of change is measured for a transmission quality (an electric intensity, a bit error rate) of a radio transmission path measured at a predetermined frequency (period), or the transmission quality exceeds a predetermined upper limit value.

b) To select as a candidate cell a cell which is adjacent to a candidate cell, or as a candidate cell for a subsequent handover.

c) To obtain a cell which corresponds both a candidate cell obtained by the above technique a) or b) and a candidate cell specified by the method of the above mentioned embodiments.

By introducing a direction of movement of the mobile station, a certainty of the candidate cell being a transferee cell can be increased.

A description will now be given of a sixth embodiment of the present invention.

A difference between the sixth embodiment and the above mentioned embodiments is that a completed call to which a selection of a candidate cell is made and a path is set to the candidate cell is limited as follows.

A description will now be given of an embodiment of the sixth embodiment.

The processor 241 obtains a single candidate cell or a plurality of candidate cells in a manner similar to the third or fourth embodiment of the present invention. After that, the processor 241 classifies the obtained cell into a boundary cell or a non-boundary cell which is not the boundary cell by referring to station information, the boundary cell being formed under a control of a mobile exchange different from a mobile exchange which controls a radio zone forming a transferor cell. Additionally, the processor 241 obtains a subscriber class of the mobile station by referring to the station information, and compares a service quality to be provided under the subscriber class with a predetermined threshold value. Then, the processor 241 forms a path only in the selected boundary cell when the service quality is less than the threshold value.

As mentioned above, in the present embodiment, a prior setting of a path is performed with respect to a handover between different mobile exchanges 235 which requires a large amount of process which is performed based on a complicated procedure in synchronization with each other so as to form a path and achieve a communication test. Accordingly, an improvement in efficiency of a handover is attempted only for a completed call which can provide an elimination of a large amount of process.

It should be noted that it is determined whether or not a setting of a path is required based on the subscriber class in the present embodiment. However, the present invention is not limited to such a subscriber class, and a similar determination may be made based on information such as a current cell, a subscriber class of a remote party or an outgoing path if the information can be surely obtained during a cooperation with a call process or a radio channel setting control.

A description will now be given of a seventh embodiment of the present invention.

The seventh embodiment has a feature in that the selection of a candidate cell is performed in the following procedure.

Figure 14:
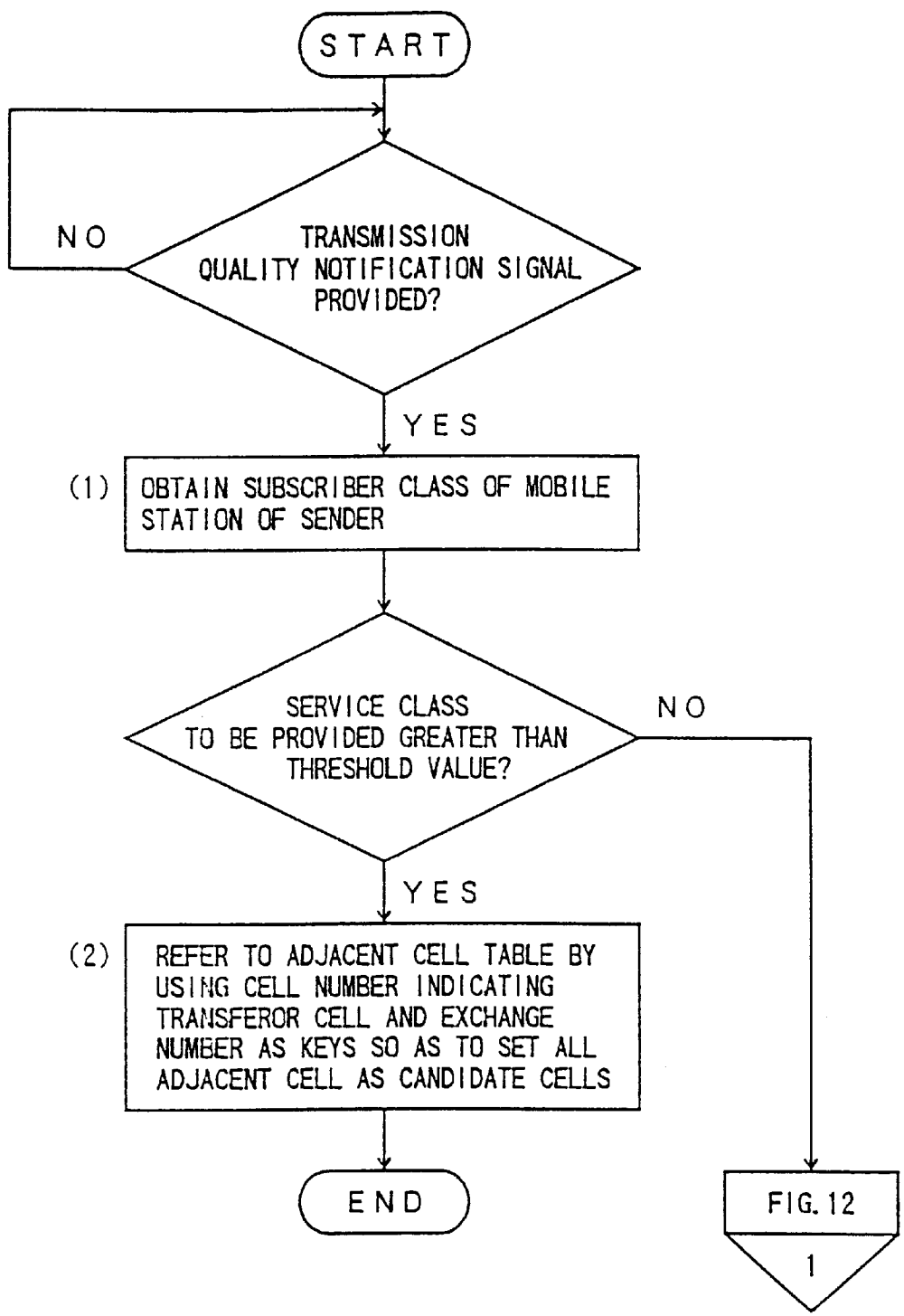
FIG. 14 is a flowchart of an operation of a seventh embodiment of the present invention.

FIG. 14 is a flowchart of an operation of the seventh embodiment of the present invention. A description will now be given, with reference to FIGS. 3, 13 and 14, of the operation of the seventh embodiment.

The data base 240 includes the adjacent cell table 255, as station information, similar to the fifth embodiment of the present invention. The processor 241 obtains a subscriber class of the mobile station 231 (FIG. 14-(1)) by referring to the station information after a transmission quality notification signal is recognized which is transmitted to the radio base station 233-1 from the mobile station 231 in which a completed call is originated.

Additionally, the processor 241 compares a service quality to be provided under the subscriber class with a predetermined threshold value. If the service quality is less than the threshold value, the processor 241 obtains a candidate cell in a manner similar to that of the above-mentioned embodiments.

However, if the service quality is greater than the threshold value, the processor 241 obtains all of the adjacent cells as a candidate cell (FIG. 14-(2)) by referring to the adjacent cell table 255 with a key being a number of an exchange and a number of cell indicating the cell in which the mobile station is located.

As mentioned above, in the present embodiment, when the service quality to be provided to the mobile station in which a completed call is originated is high, all of the adjacent cells are selected as candidate cells. Thus, a selection of the candidate cells and a setting of a path with respect to the candidate cells can be efficiently and rapidly performed without a complicated process being performed.

A description will now be given of an eighth embodiment of the present invention.

A difference between the eighth embodiment and the above-mentioned embodiments is that the transmission paths 234-1 to 234-N are structured based on an Asynchronous Transfer Mode (ATM) System.

Figure 15:
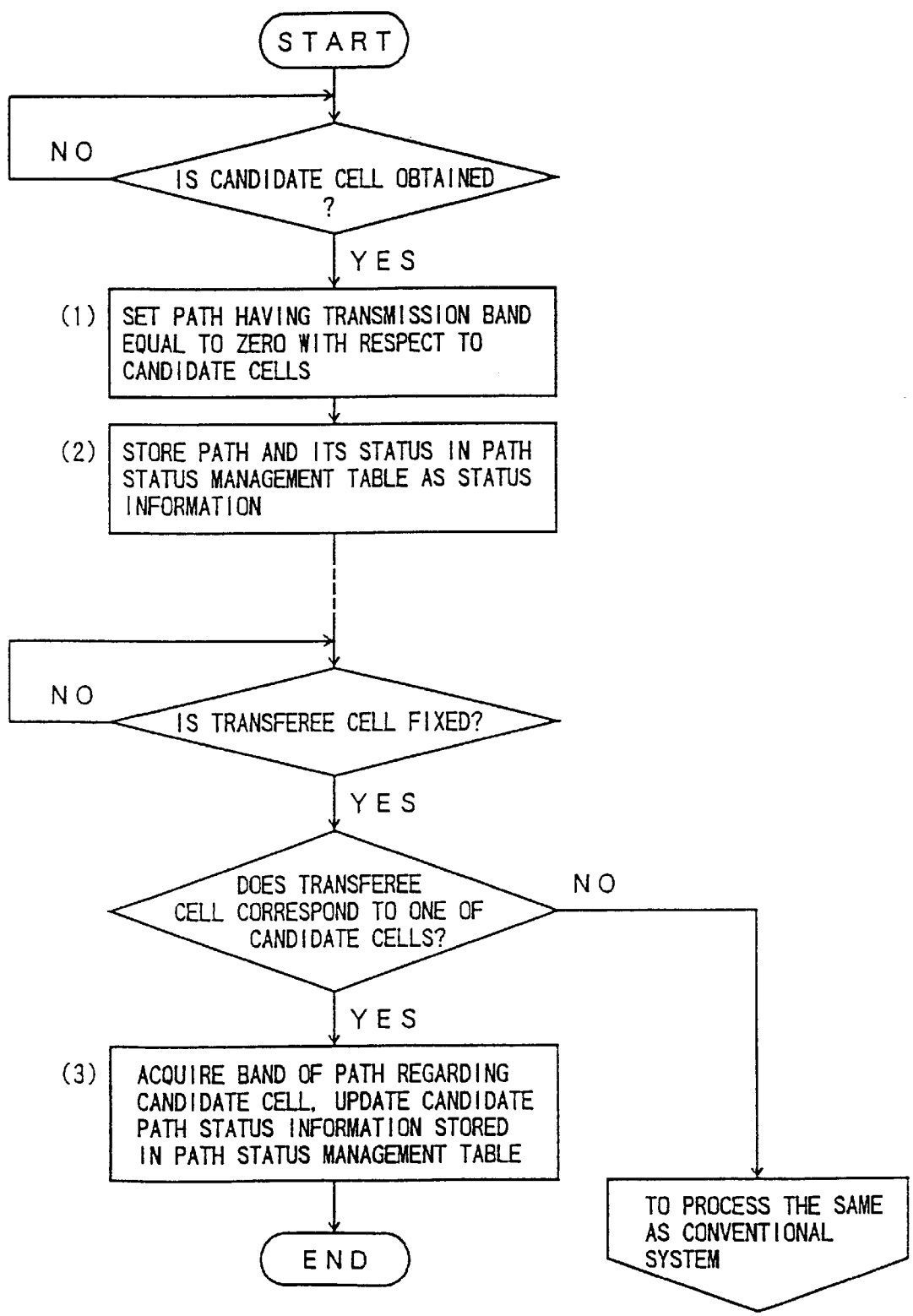
FIG. 15 is a flowchart of an operation of an eighth embodiment of the present invention.

FIG. 15 is a flowchart of an operation of the eighth embodiment. A description will now be given, with reference to FIGS. 3, 4 and 15, of the operation of the eighth embodiment of the present invention.

The processor 241 obtains candidate cells in a manner similar to that of the previously mentioned embodiments. When the processor 241 sets a path to the candidate cells, a transmission band of the path is set to zero, that is, the transmission band is not reserved (FIG. 15-(8)). This status is stored as candidate path status information in the path status management table 250 (FIG. 15-(2)).

Additionally, the processor 241 determines whether or not the actual transferee cell corresponds to one of the above mentioned candidate cells. If the result of determination is affirmative, a desired transmission band is reserved for the corresponding candidate cell, and information representing the desired transmission band is added to the candidate path status information stored in the path status management table 250 with respect to the candidate cell (FIG. 15-(3)).

Accordingly, in the present embodiment, a high-efficiency, high-speed operation can be attempted for a handover, similar to the previously mentioned embodiments, without setting an unnecessary transmission path to the transmission paths 234-1 to 234-N.

A description will now be given of a ninth embodiment of the present invention.

In the ninth embodiment, the transmission paths 234-1 to 234-N are formed based on the Asynchronous Transfer Mode (ATM) System similar to the eighth embodiment.

A description will now be given, with reference to FIGS. 3, 4, 7 and 15, of an operation of the ninth embodiment.

The processor 241 obtains candidate cells in a manner similar to that of the previously mentioned embodiments. When the processor 241 sets a path to the candidate cells, a transmission band of the path is set to a desired value (not equal to zero). This status is stored as candidate path status information in the bus status management table 250.

Additionally, the processor 241 determines whether or not the actual transferee cell corresponds to one of the above-mentioned candidate cells. If the result of determination is affirmative, the assigned band is canceled for the candidate cells other than the one of the candidate cell determined to be the transferee cell, and updates the candidate path status information stored in the path status management table 250 in response to the cancellation.

According to the present embodiment, a path can be positively set to all of the candidate cells which may be a transferee cell prior to the handover. When the transferee cell is determined, a band reserved for the transmission paths 234-1 to 234-N which corresponds to the remaining candidate cells which did not become the transferee cell is positively released.

Accordingly, an efficient use of resources can be attempted as well as a high-efficiency, high-speed operation for a handover, since it can be avoided to unnecessarily occupy a band with respect to candidate cells which may be candidate cells in the subsequent handover process.

A description will now be given of a tenth embodiment of the present invention.

A difference between the tenth embodiment and the previously mentioned embodiments is that the number of candidate cells is limited base on the following process.

The processor 241 obtains candidate cells in a manner similar to the previously mentioned embodiments, and obtains a number K of the candidate cells. Additionally, the processor 241 obtains a result of analysis of numbers (for example, trunk group number of an outgoing path), information regarding a subscriber class of a receiver, a subscriber class of a transmitter and other information. Then, the processor 241 obtains a priority for a communication service to be provided to the corresponding completed call by performing predetermined calculations and logic operations based on the obtained information.

The processor 241 increases an upper limit value of the number of candidate cells as the thus obtained priority is higher, and compares the number K with the upper limit value. If the number K is less than the upper limit value, the processor 241 sets a free path of the candidate cells in a manner similar to the previously mentioned embodiment. On the other hand, if the number K is greater than the upper limit value, the processor 241 sets the path after limiting the number of candidate cells to less than the upper limit value.

Accordingly, the number of selected candidate cells is increased as the priority of a completed call is higher, and the priority path is set to the candidate cells. Thus, the efficiency and the speed of the handover process are increased as compared to the previously mentioned embodiments.

It should be noted, in the present embodiment, although the upper limit value of the candidate cells is set in response to the priority of the completed call, the upper limit value may be set to a greater value as transmission quality measured during a communication is increased, or the upper limit value may be set to a smaller value as a loss probability or a level of congestion (may be either a communication path or an outgoing path) is increased. In such a case, increased efficiency and a speed-up of the handover process can be attempted.

Additionally, in a future mobile communication system in which a plurality of communication services are concurrently provided to a unit subscriber via a plurality of calls (for example, a telephone call and a facsimile call) or a plurality of connections (for example, connections concurrently formed for transmission of sound and an image), the above mentioned upper limit value may be set to a greater value as the number of calls or connections being actually used is increased so that a probability of the candidate cell not turning to a transferee cell is reduced. On the contrary, a decrease in an amount of calls or connections may have priority by setting a smaller value to the upper limit value as the number of calls or connections is increased.

A description will now be given of an eleventh embodiment of the present invention.

A difference between the eleventh embodiment and the previously mentioned embodiments is that the processor 241 performs a process (hereinafter referred to as a moment determining process) for determining a time (hereinafter referred to as a moment) for starting a process (hereinafter referred to as a candidate cell selecting process) of selecting a candidate cell.

Figure 16:
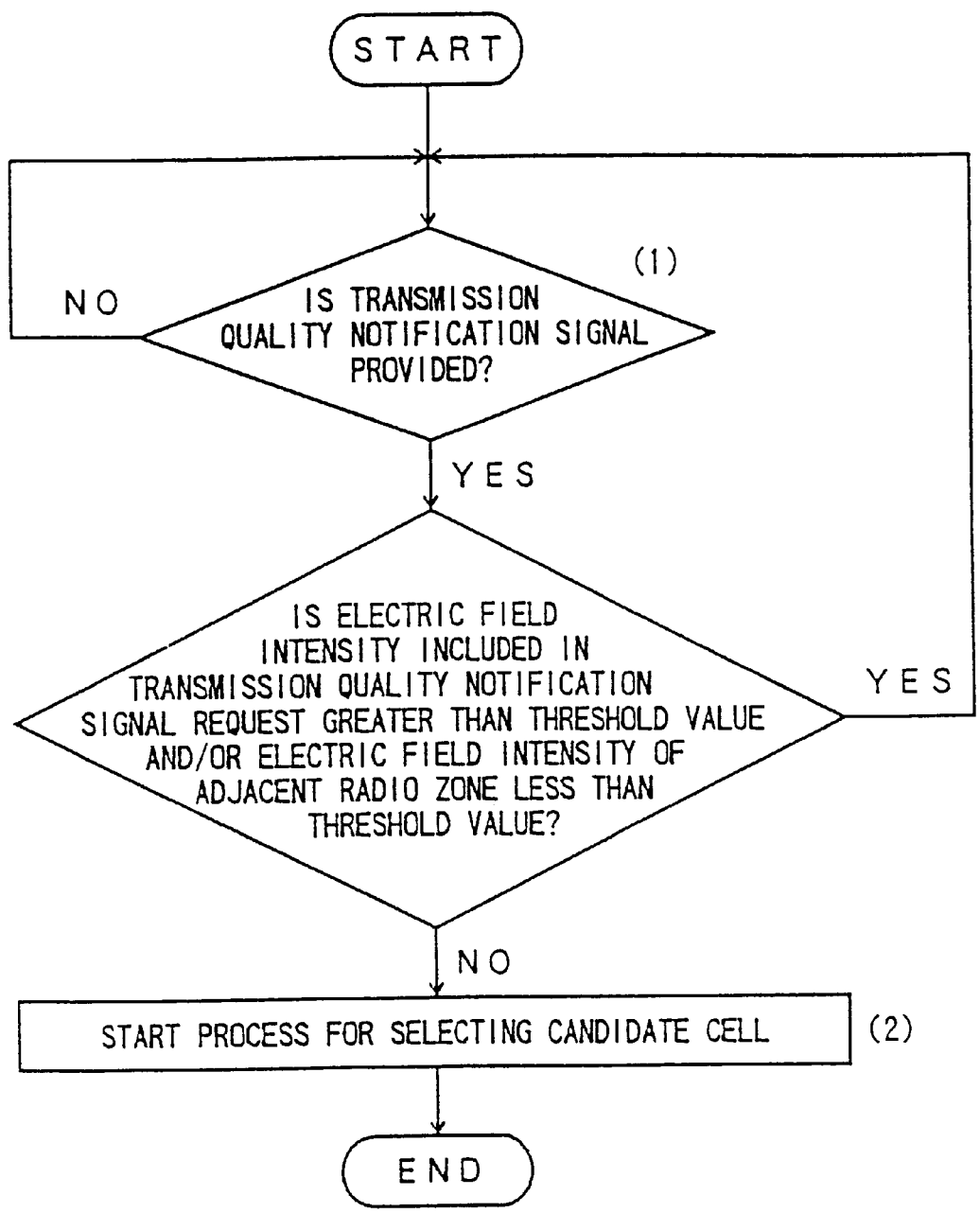
FIG. 16 is a flowchart of an operation of an eleventh embodiment of the present invention.

FIG. 16 is a flowchart of an operation of the eleventh embodiment of the present invention. A description will now be given, with reference to FIGS. 3 and 16, of the eleventh embodiment of the present invention.

The processor 241 performs the abovementioned moment determining process for each of the completed calls discriminated based on a call process procedure at a predetermined frequency. In such a moment determining process, when a transmission quality notification signal is provided by the mobile station 231 in which a call originated therein becomes a completed call in a manner similar to the abovementiend first embodiment, the processor 241 compares an electric field intensity included in the transmission quality notification signal with a predetermined threshold value set for the electric field intensity.

If the electric field intensity of the current radio zone is greater than the threshold value or the electric field intensity of an adjacent radio zone is smaller than the threshold value, the processor 241 waits until the transmission quality notification signal is provided (FIG. 16-(1)). On the other hand, if the electric field intensity of the current radio zone is smaller than the threshold value and/or the electric field intensity of an adjacent radio zone is greater than the threshold value, the processor 241 immediately starts the candidate cell selecting process (FIG. 16-(2)).

According to the present embodiment, the candidate cell selecting process is not started by the transmission quality signal provided by the mobile station 231 alone. That is, the candidate cell selecting process is started with a high probability at a time when the mobile station 231 is moving outwardly of the current cell and it is determined that the mobile station 231 is located within a predetermined distance from an outer periphery of the current cell.

Accordingly, in the present embodiment, the processor 241 does not unnecessarily perform the candidate cell selecting process, and the processing performed by the processor 241 is effectively used for a call process.

A description will now be given of a twelfth embodiment of the present invention.

A difference between the twelfth embodiment and the previously mentioned embodiments is in a criterion of determination used by the processor 241 for determining a moment in a moment determining process.

Figure 17:
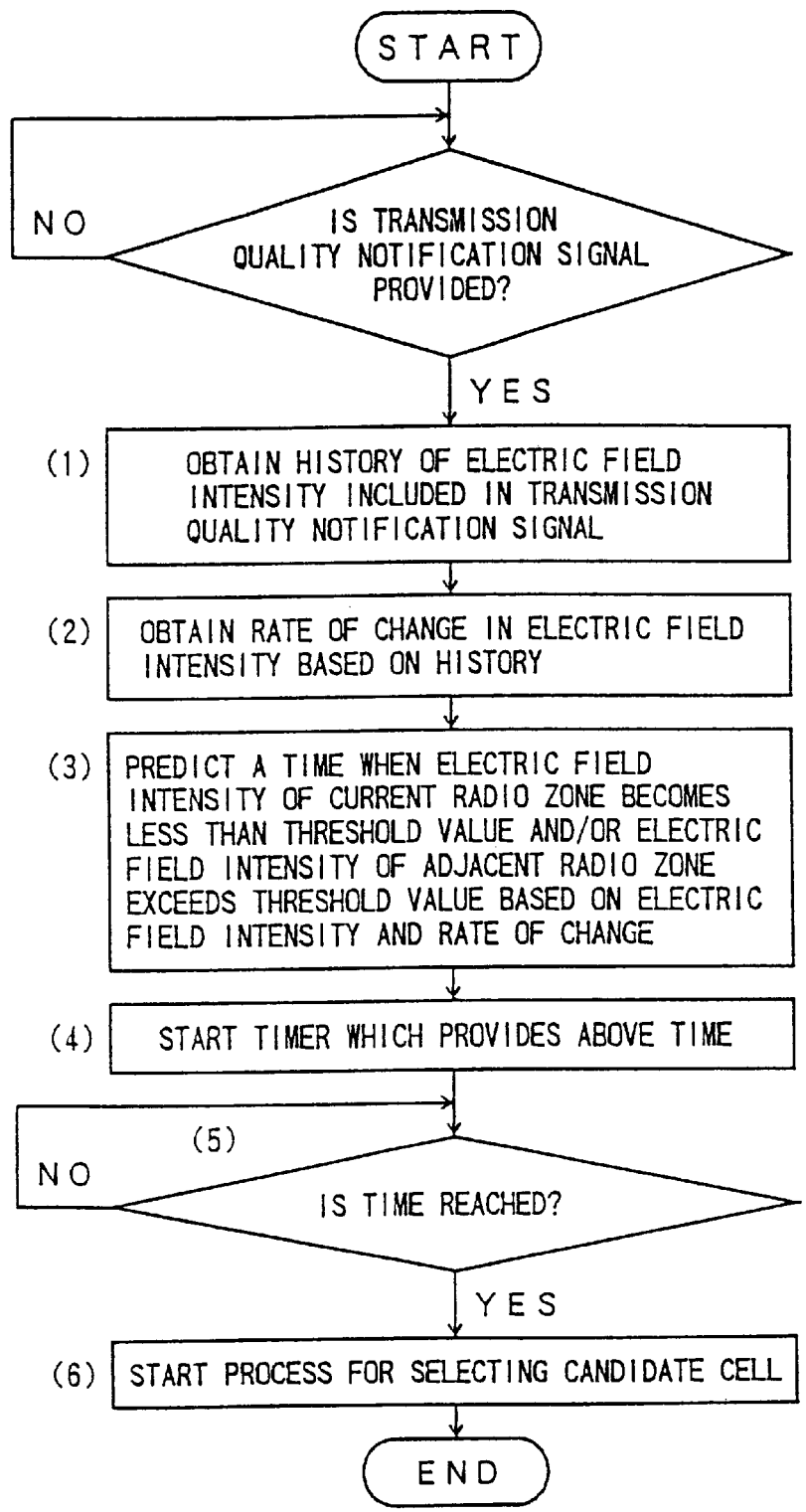
FIG. 17 is a flowchart of an operation of a twelfth embodiment of the present invention.

FIG. 17 is a flowchart of an operation of the twelfth embodiment of the present invention. A description will now be given, with reference to FIGS. 3 and 17, of the operation of the twelfth embodiment.

In the moment determining process, when the transmission quality notification signal is provided by the mobile station 231 which has a call originated therein being changed to a completed call, the processor 241 obtains a history of the electric field intensity included in the transmission quality notification signal (FIG. 17-(1)). Then, the processor 241 obtains a rate of change in the electric field intensity based on the obtained history (FIG. 17-(2)).

Additionally, the processor 241 predicts based on the electric field intensity and the rate of change, a time when the electric field intensity of the current radio zone becomes less than the predetermined threshold value and/or a time when the electric field intensity of the adjacent radio zone exceeds the predetermined threshold value (FIG. 17-(3)). Then, the processor starts a timer which provides those times (it is assumed that the timer is achieved by software for the sake of simplification) (FIG. 17-(4)).

The processor 241 waits until the abovementioned time is provided by the timer while omitting a process for the transmission quality notification signal subsequently provided as long as a completed call is concerned (FIG. 17-(5)). However, if such a time is provided by the timer, the processor 241 immediately starts the candidate cell selecting process (FIG. 17-(6)).

That is, in the present embodiment, the candidate cell selecting process is not started by the transmission quality notification signal provided by the mobile station 231 alone. Accordingly, the candidate cell selecting process is positively started as is in the eleventh embodiment even when the transmission quality notification signal cannot be normally received due to a deterioration of a transmission characteristic of the radio transmission path.

Accordingly, in the present embodiment, an amount of processing necessary for the moment determining process is greatly reduced, and responsiveness and service quality can be increased by a surplus capacity of the processor 241.

It should be noted that although the time when the candidate cell selecting process is started is predicted based on the electric field intensity and the rate of change, such time may be predicted by a speed of movement of the mobile station instead of the rate of change in the electric field intensity when the speed of the mobile station relative to the radio base station of the cell in which the mobile station is located can be measured.

A description will now be given of a thirteenth embodiment of the present invention.

A feature of the thirteenth embodiment is in a process procedure for selecting the candidate cell to be released from among the candidate cells which were selected but did not actually become a transferee cell.

Figure 18:
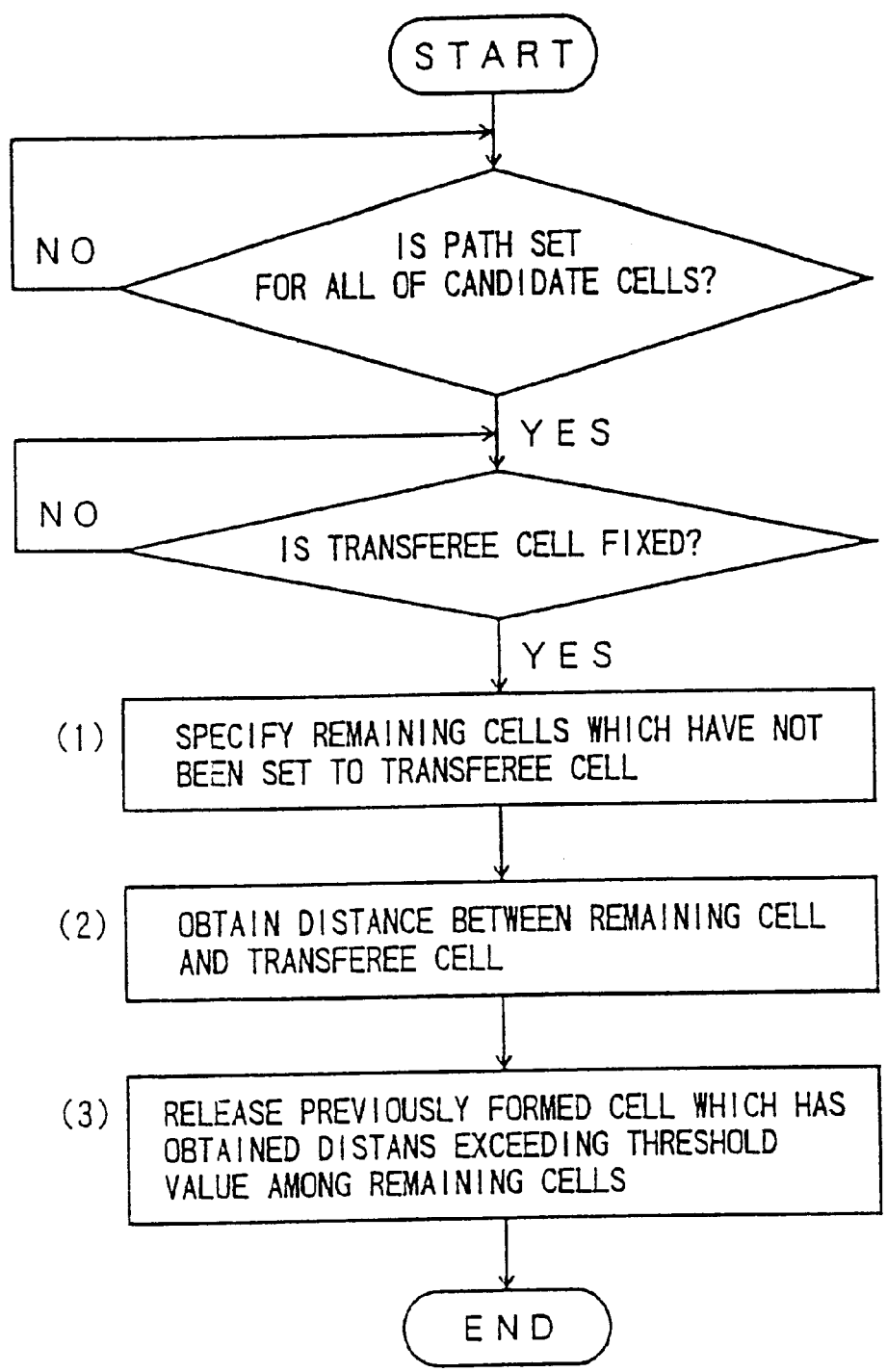
FIG. 18 is a flowchart of an operation of a thirteenth embodiment of the present invention.

FIG. 18 is a flowchart of an operation of the thirteenth embodiment of the present invention. A description will now be given, with reference to FIGS. 3 and 18, of the thirteenth embodiment of the present invention.

The database 240 includes a cell distance table 256, as station information, which indicates a distance between two cells for all combinations. It is assumed that each of the cells is represented by a pair of a number of the exchange and a number of the cell as shown in the path status management table 250 or the adjacent cell table 255 for the sake of simplification.

After the processor 241 recognizes that a path is set to each of the candidate cells and the transferee cell is determined, the processor 241 specifies remaining candidate cells which were not turned to the transferee cell from among the candidate cells (FIG. 18-(1)). Then, the processor 241 obtains a distance corresponding to a combination of the transferee cell and each of the remaining candidate cells, the distance being stored in the cell distance table 256 (FIG. 18-(2)).

The processor 241 does not apply any process to the cell corresponding to the thus obtained distance which is less than a predetermined threshold value since such cell may become a transferee cell in a subsequent handover. On the other hand, the processor 241 releases the previously formed path of the cell corresponding to a distance which is greater than the threshold value by cooperating with the radio base station which forms the corresponding candidate cell since such cannot be a transferee cell.

According to the present embodiment, since the path set to the candidate cell which cannot be a transferee cell in a subsequent handover is positively released, such released path can be effectively assigned to other calls. Thus, a probability of generation of a call loss due to a lack of paths can be reduced.

Figure 20:
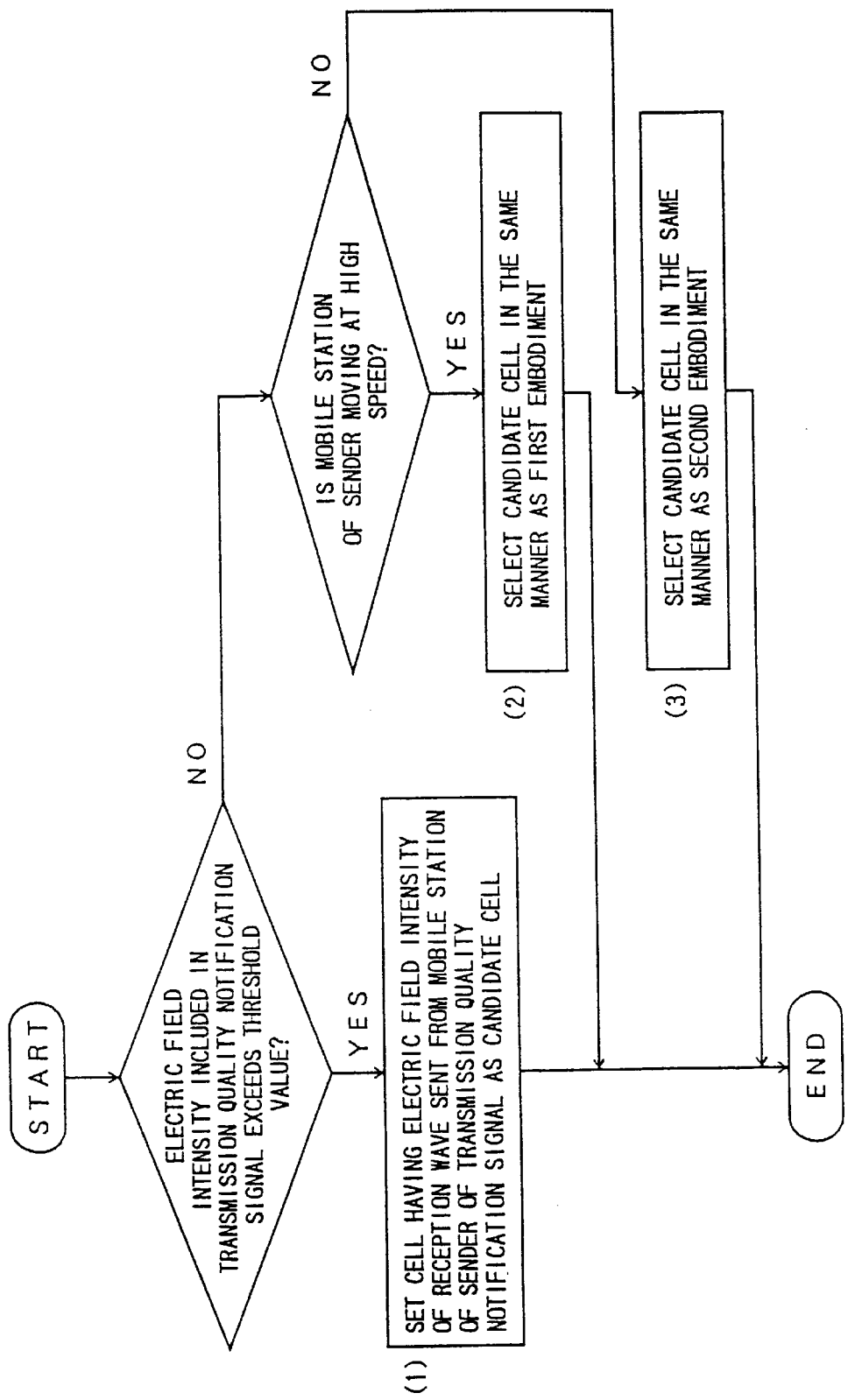
FIG. 20 is a flowchart of an algorithm for selecting a candidate cell base on a combination of a plurality of criteria.

It should be noted that the candidate cells are selected based on a single criterion in the third to sixth embodiments. However, as shown in FIG. 20, an algorithm can be adapted in which a cell is selected as a candidate cell having an electric field intensity greater than a predetermined threshold value (FIG. 20-(1)) when the electric field intensity of the transmission quality notification signal received by the radio base station 231 is greater than the predetermined threshold value. On the other hand, in the above-mentioned algorithm, if the electric field intensity is less than the threshold value and when it is assumed that the mobile station 231 is moving at a high speed, a candidate cell is selected in the same manner as that described in relation to the above-mentioned first embodiment (FIG. 20-(2)) since there is a high possibility that the mobile station 231 is moving along a major track (a state root, a major road, a railway).

Additionally, in the above-mentioned algorithm, when it is assumed that the mobile station 231 is not moving at a high speed, a candidate cell may be selected in the same manner as that described in relation to the above-mentioned second embodiment (FIG. 20-(3)). That is, the candidate cell may be selected by applying a moving pattern registered in the subscriber responsive moving pattern 253 or the moving pattern table 254 since there is a high possibility that the mobile station 231 is moving along a road other than the registered roads.

A description will now be given of other embodiments related to the candidate cells which were selected but did not become a transferee cell.

In the previously mentioned embodiments, a time spent on a handover is reduced by predicting a handover by a network side and setting a path beforehand.

If a call is ended before the handover or if the mobile station does not move as predicted, the path set beforehand is useless.

Accordingly, in a fourteenth embodiment of the present invention, there is provided a means for registering the previously set path in a free candidate path management table so as to use the registered path to a new call originated in other mobile stations or a handover of other mobile stations.

In a fifteenth embodiment, there is provided a means for determining whether or not the free candidate path is registered in the table in accordance with a rate of occupation for a frequency by the free candidate path.

In a sixteenth embodiment, there is provided a means for selecting whether to perform a handover by a conventional procedure or to connect a communication link to a radio channel by acquiring the radio channel after waiting a completion of a setting of a wire link when the a request for the handover is generated during a setting process of the communication link.

In a seventeenth embodiment, a time of completion of a setting of the communication link and a time of occurrence of a handover are predicted in the exchange. If the time of completion of a setting of the communication link is earlier than the time of occurrence of a handover, the handover is performed after the setting of the communication link is completed. If the time of occurrence of a handover is earlier than the time of completion of a setting of the communication, the handover is performed by a conventional method without waiting for the completion of the setting of the communication link.

In an eighteenth embodiment, there is provided a means for stopping the setting of the communication link which is performed prior to the handover when use of resources is a high-rate such as a case in which a rate of use of a band is a high, a large load is applied to the processor of the exchange, or a rate of use of free channels is high.

A description will now be given, with reference to FIGS. 28 to 32, of a general operation of the fourteenth to eighteenth embodiments of the present invention.

Figure 21:
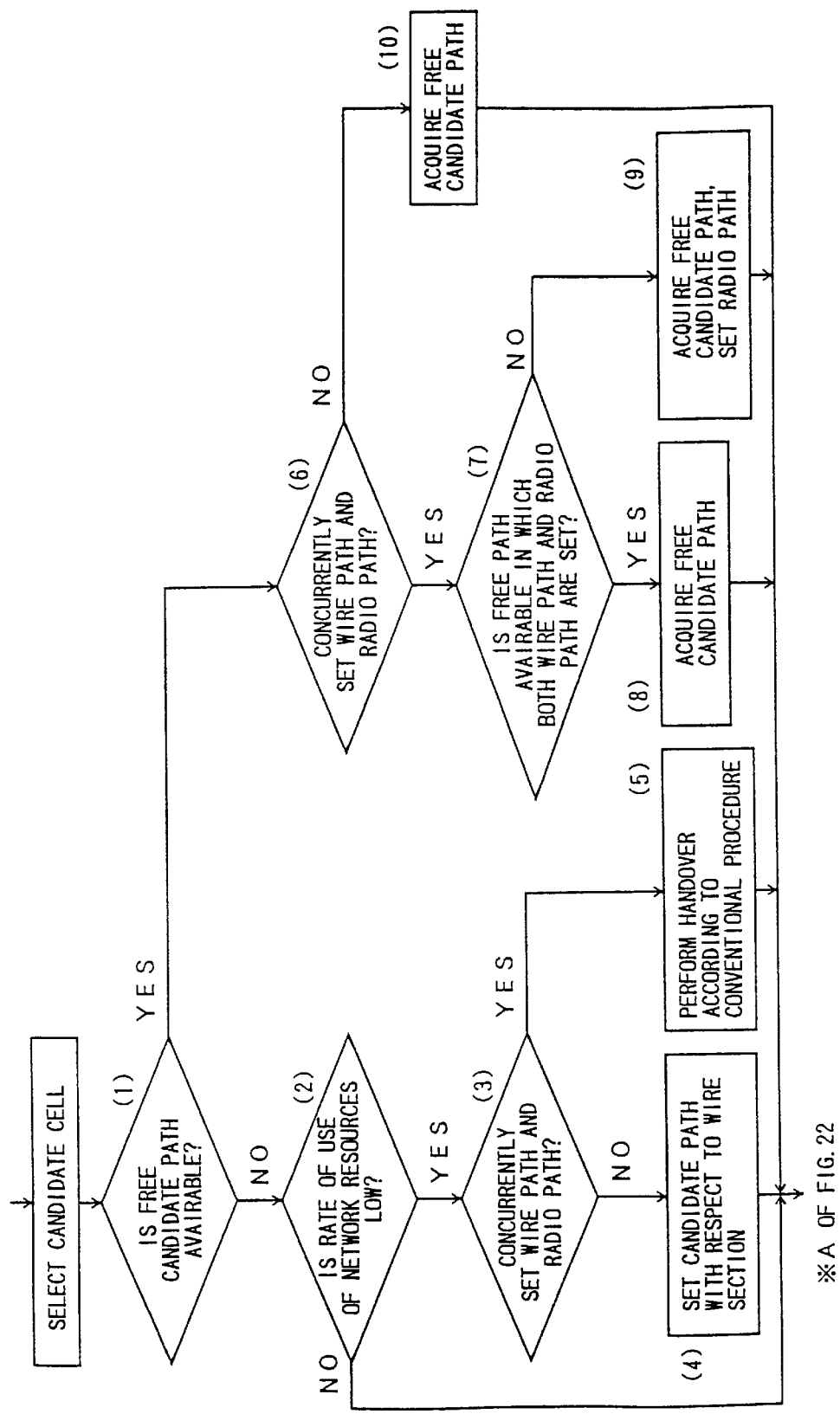
FIG. 21 is a part of a flowchart of an operation performed in fourteenth to eighteenth embodiments of the present invention.

When the candidate cells are obtained for the completed call, a check is made as to whether or not a free candidate path which has already been set to the candidate cell (FIG. 21-(1)). If there is no free candidate path available, it is determined whether or not a rate of use of the network resources is low. If the rate of use is high, the candidate path is not set (FIG. 21-(2)). On the other hand, if the rate of use of the network resources is low, it is determined whether both a wire path and a radio path are set as the candidate path (FIG. 21-(3)).

If only a wire path is going to be set as the candidate path, the candidate path is set for the wire section (FIG. 21-(4)). If both a wire path and a radio path are going to be set as the candidate path, a setting of the wire path and acquisition of a radio channel are performed, and they are connected to each other (FIG. 21-(5)). If there is an available free candidate path, it is determined whether or not both a wire path and a radio path have been set as the candidate path (FIG. 21-(6). If both a wire path and a radio path are going to be set, it is determined whether there is a path to which both a wire path and a radio path have been set among the available free candidate paths (FIG. 21-(7)). If there is a path as the free candidate path to which both a wire path and a radio path have been set, the free candidate path is acquired (FIG. 21-(8)). On the other hand, if there is not a path to which both a wire path and a radio path have been set (that is, there is a path to which only a wire path has been set), a radio channel is acquired to connect to each other after the free candidate path is acquired (FIG. 21-(9)).

If both a wire path and a radio path are not going to be set as the candidate path (that is, only a wire path is going to be set as the candidate path), the candidate path to which only a wire path has been set is acquired. It should be noted that, if there is only a path to which both a wire path and a radio path have been set, such a path is acquired (FIG. 21-(10)).

Thereafter, the mobile exchange 235 receives a handover request signal from the mobile station 231. (FIG. 22-(11)). It is then determined whether or not a candidate path is set to the candidate cell having the completed call (FIG. 22-(12)). If the determination is negative (that is, if a candidate path has not been set to the cell to be handover), a handover is performed by a conventional method (FIG. 22-(21)).

Figure 22:
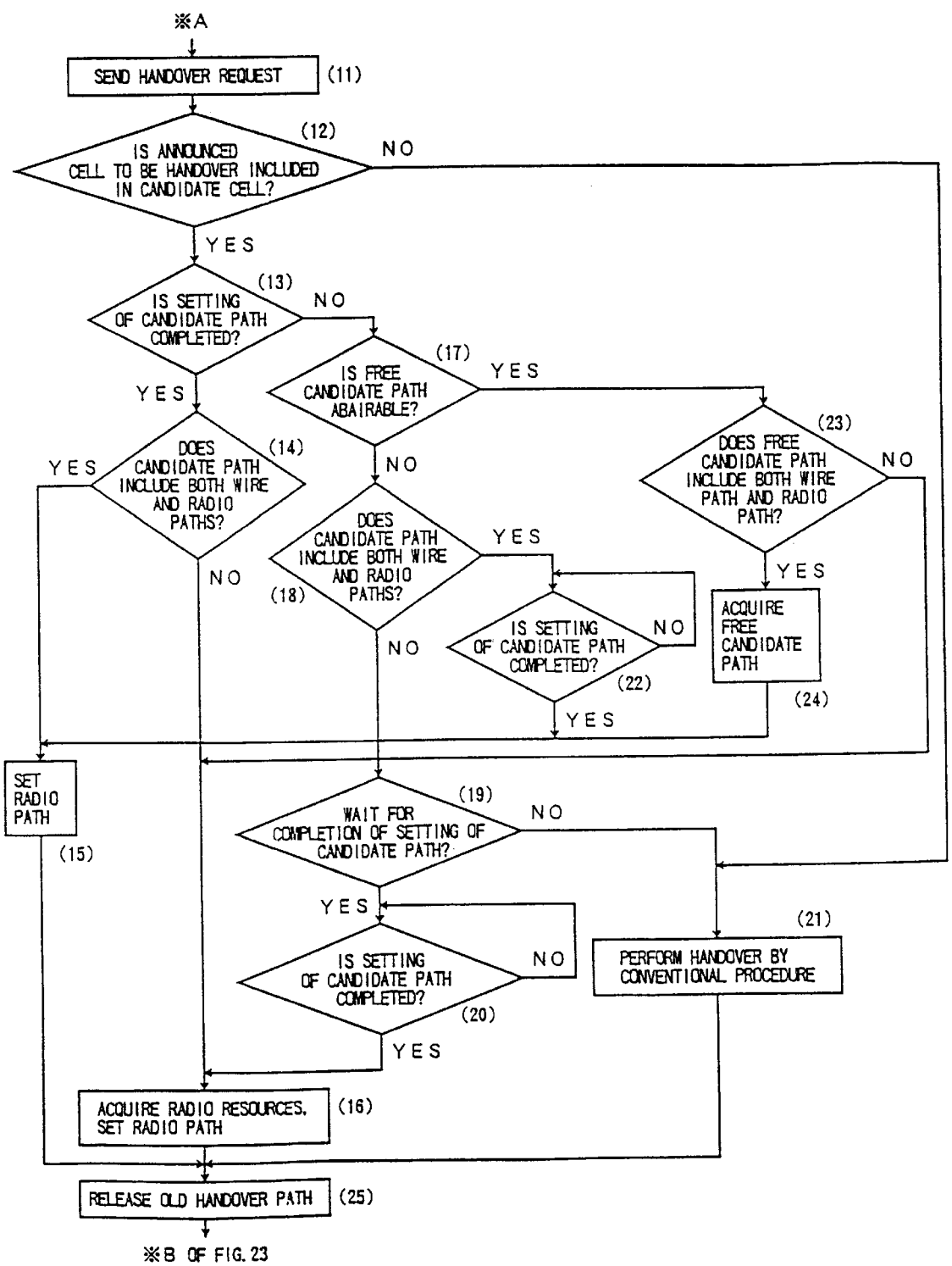
FIG. 22 is a part of a flowchart of an operation performed in fourteenth to eighteenth embodiments of the present invention.

If a candidate path has been set to the cell for handover, it is then determined whether or not the setting is completed (FIG. 22-(13)). If the setting of the candidate path has been completed, it is determined whether or not both a wire path and radio path have been set as the candidate path to which a setting is completed with respect to the corresponding call (FIG. 22-(14)).

If the candidate path comprising a wire path and a radio path has been set for the completed call, necessary signals are exchanged with the mobile station 231 so as to set the radio path (FIG. 22-(15)). If the candidate path comprising only a wire path has been set, a radio path is set and the wire path is connected to the radio path. Additionally, necessary signals are exchanged with the mobile station 231 (FIG. 22-(16)). If the setting of the candidate path which is assigned as a path for the handover has not been completed yet, it is determined whether or not a free candidate path which is assigned as a path for the handover (FIG. 22-(17)).

If there is not available free candidate path, it is determined whether or not the candidate path being set comprises both a wire path and a radio path (FIG. 22-(18)).

If the candidate path being set does not comprise not both a wire path and a radio path (that is, the candidate path comprises only a wire path), it is then determined whether or not to wait for a completion of the setting of the candidate path (FIG. 22-(19)). If the completion of the setting is to be waited, a setting of a radio path is performed after the setting of the candidate path is completed (FIG. 20-(20)). If the completion of the setting is not to be waited, a handover is performed by a conventional procedure (FIG. 22-(22)).

If there is an available free candidate path, it is determined whether or not the free candidate path comprises both a wire path and a radio path. If the determination is negative (that is, the free candidate path comprises only a wire path), a radio path is acquired after the free candidate path is acquired so as to set the radio path (FIG. 22-(3)).

If the free candidate path comprises both a wire path and radio path, signals are exchanged with the mobile station 231 after the candidate path is acquired so as to set the radio path.

Figure 23:
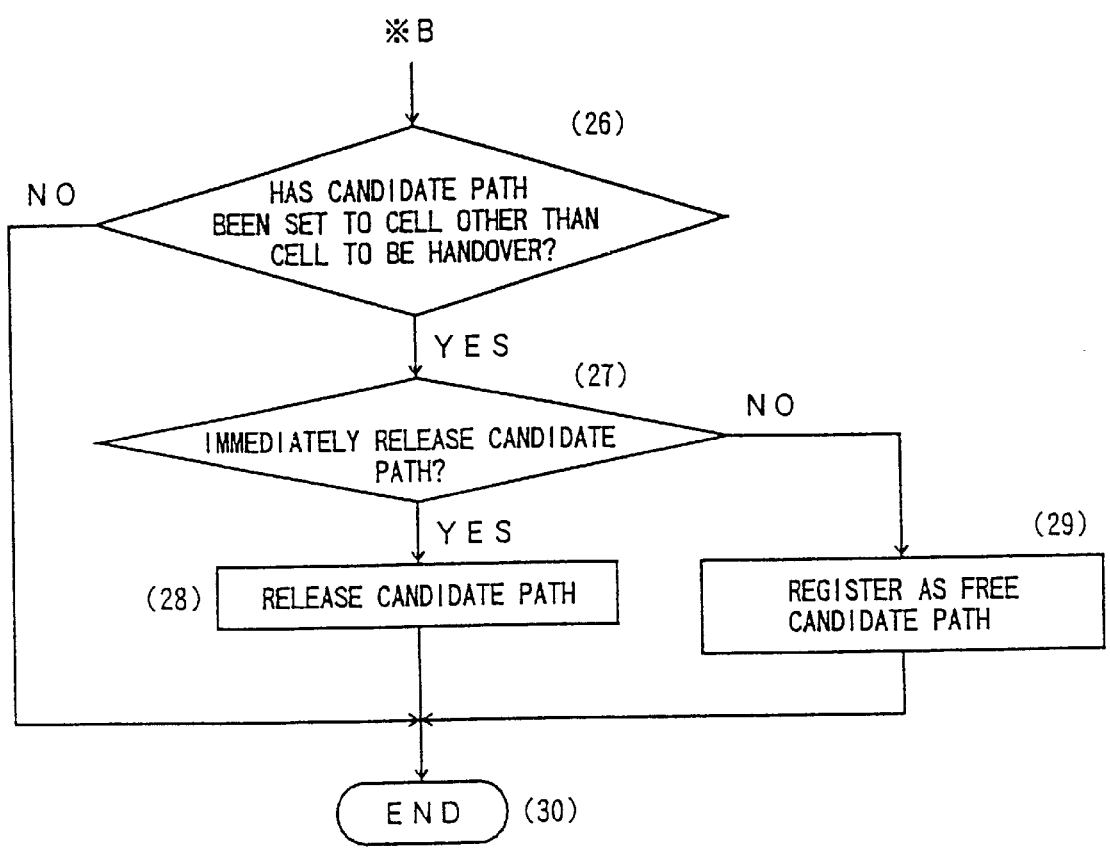
FIG. 23 is a part of a flowchart of an operation performed in fourteenth to eighteenth embodiments of the present invention.

After a setting of a handover path which is used for a communication is completed, the path which has been set for the transferor cell is released (FIG. 22-(25)). Then, it is determined whether or not the a candidate path has been set for the transferee cell (FIG. 23-(26). If a candidate path has been set for a cell other than the transferee cell, it is determined whether or not such a path should be immediately released (FIG. 23-(27). If it is determined that the candidate path should be released, a release operation is performed with respect to the candidate path (FIG. 23-(28)). If it is determined that the candidate path should be reserved to reuse for a new call or handover, the candidate path is (not released) registered as a free candidate path (FIG. 23(29)). Then, the handover is ended (FIG. 23-(30)).

A description will now be given, with reference to FIG. 24, of a new call process in the present invention.

Figure 24:
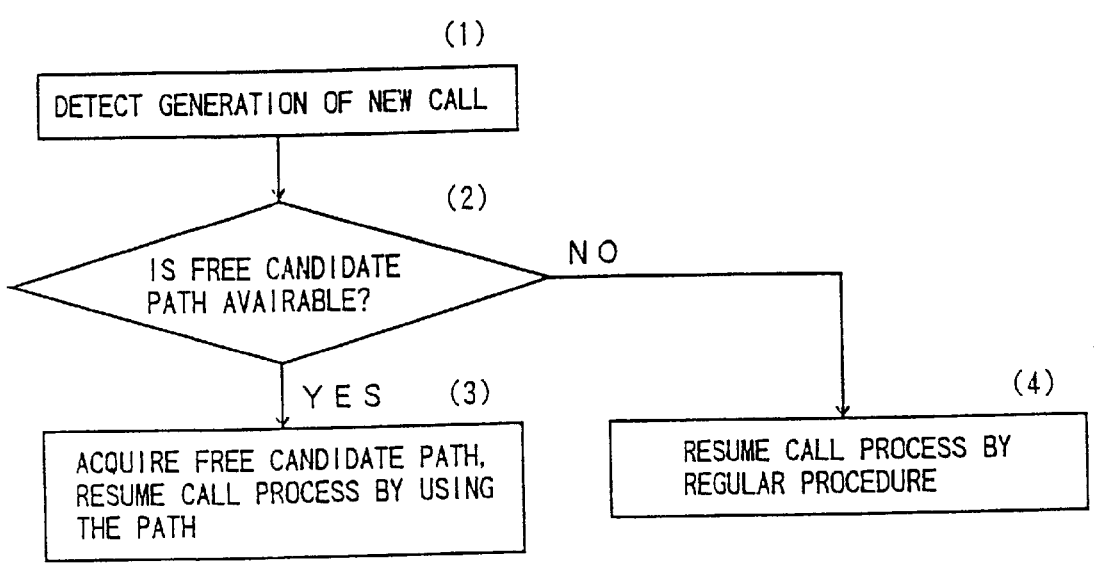
FIG. 24 is a chart of explaining a new call process.

A new call is detected (FIG. 24-(1)). The exchange 235 determines whether or not a free candidate path is available for a setting of a path used for a new call (FIG. 24-(2)). If there is an available free candidate path, the free candidate path is acquired and the call process is resumed (FIG. 24(3)). If there is no free candidate path available, the call process is performed by a procedure the same as that of a conventional system (FIG. 24-(4)).

A description will now be given, with reference to FIG. 25, of the fourteenth embodiment of the present invention.

FIG. 25 is an illustration for explaining a table used for managing a free candidate path. A candidate path which was set but was not used is registered as a free candidate path in the table. Information set when the registration is performed includes the followings.

"candidate path identifier" is a number to be used for identifying a candidate path.

"path setting cell identifier" indicates an exchange having a base station to which a free candidate path is connected from own exchange. In the present embodiment, this indicates a state represented by a combination of a number of an exchange and a number of a base station.

"line identifier" is a number used for specifying a line when each candidate path is used. In the present embodiment, this is indicated by a combination of an outgoing path and an incoming path.

"acquisition band" indicates a band acquired by each candidate path.

"path type" indicates that each candidate path is constituted by a wire path and a radio path or by a wire path alone.

The table is referred to during other new call process and a handover process, and a candidate path which matches a condition of an objective call is used.

A description will now be given, with reference to FIG. 26, of an operation of the fifteenth embodiment according to the present invention.

Figure 26:
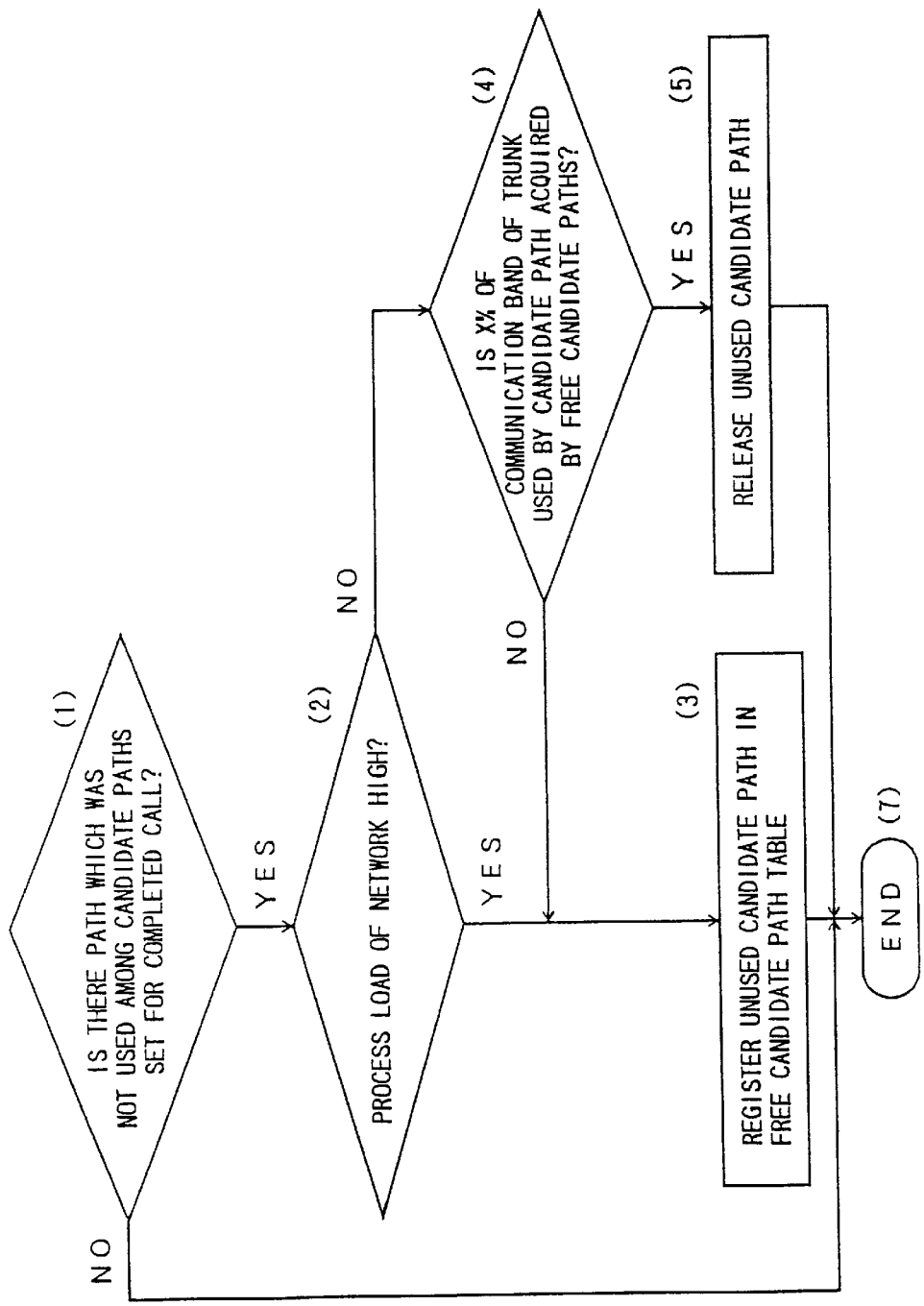
FIG. 26 is a flowchart of an operation of a fifteenth embodiment of the present invention.

It is determined whether or not there is a path which was not used among candidate paths which were set in relation to a completed call (FIG. 26-(1)). If a result of the determination is negative, the process is ended. On the other hand, if the determination is affirmative, it is determined whether or not a process load to the network is high. (FIG. 26(2)). If a result of the determination is negative, it is determined whether or not X% (X is a predetermined threshold value) of a communication band assigned to an outgoing trunk (or incoming trunk) used by the candidate path is acquired by the free candidate paths (FIG. 26-(4)). If a result of the determination is affirmative, the candidate path which was not used is released (FIG. 26-(5)). If a result of the determination is negative, the candidate path which was not used is registered in the candidate path management table so as to reserve the candidate path (FIG. 26-(3)). Then, the operation is ended (FIG. 26-(7)).

A description will now be given, with reference to FIG. 27, of the sixteenth embodiment of the present invention. FIG. 27 is an illustration for explaining attributes added to the path status management table.

"path type" indicates whether the candidate path comprises both a wire path and a radio path or a wire path alone.

"time stamp" indicates a time when a candidate zone selecting means starts a setting of a candidate path.

When a handover request signal is received, and if the path type shown in FIG. 27 indicates a wire path and the candidate path status indicates a setting, a sum of "a predicted time until a setting of the candidate path is completed" and "a predicted process delay time for setting a radio path" is calculated by referring to the time stamp. The sum is compared with "a predicted process delay time when a handover is performed by a conventional procedure". If the former is less than the later, a setting of the radio path is started after a completion of a setting of the candidate path. If it is determined that the later is less than the former, a handover is performed by a conventional procedure without waiting for a completion of the setting of the candidate path.

It should be noted that prediction of a process time needed for setting the candidate path and a process delay due to a conventional procedure can be performed by referring to information by the exchange, the information being previously obtained with respect to an average process delay time for setting the candidate path in a form corresponding to a rate of use of a CPU of the terminal or a number of candidate paths. Additionally, accuracy of the prediction can be increased by obtaining information with respect to the average process time by considering a status of load of a CPU of an adjacent exchange.

A description will now be given, with reference to FIG. 28, of the seventeenth embodiment of the present invention.

Figure 28:
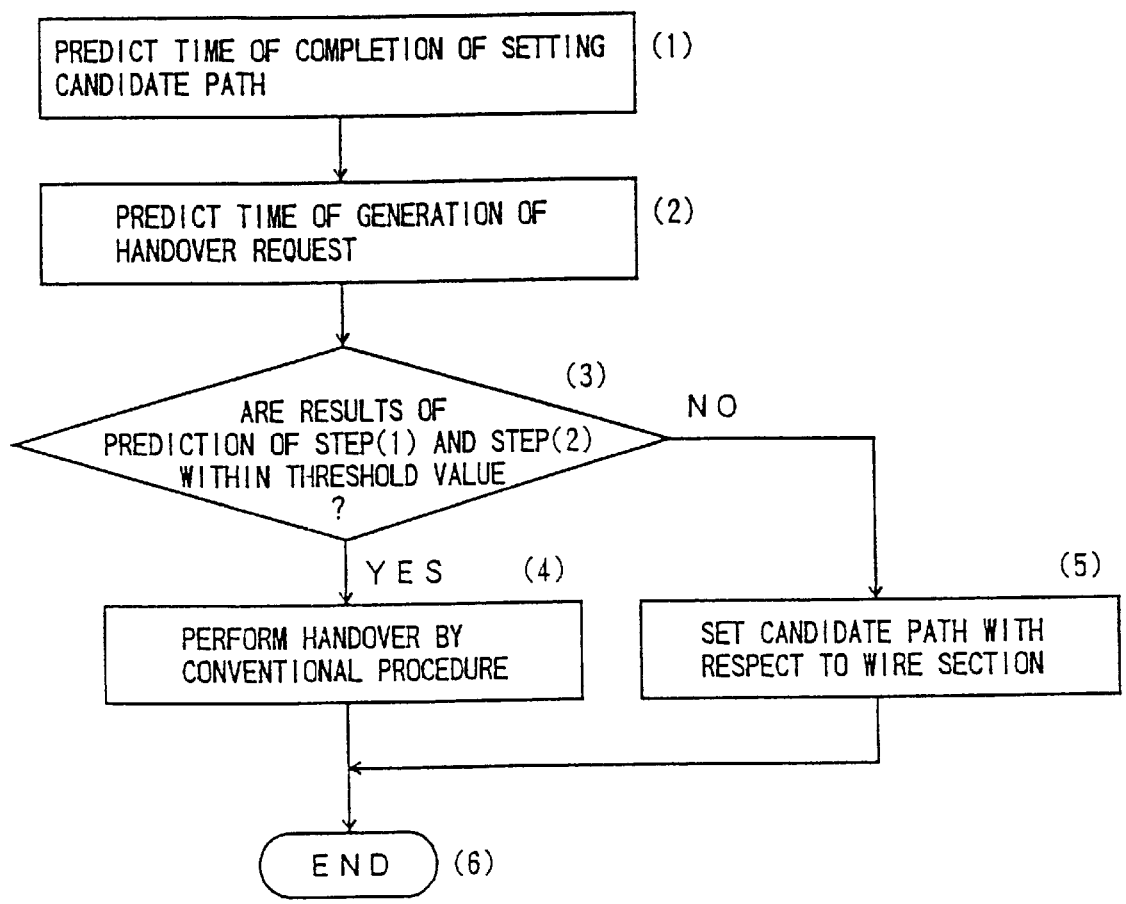
FIG. 28 is an illustration of an operation performed in a fourteenth embodiment of the present invention.

The exchange 235 predicts a time for completing a setting of the candidate path by the candidate zone selecting means (FIG. 28-(1)) in accordance with a rate of use of its own CPU or a number of candidate paths to be set with respect to a completed call (refer to the sixteenth embodiment for a method for prediction). Then, a time of occurrence of the handover request is predicted (FIG. 28-(2)). It is then determined whether or not the time predicted in the steps (1) and (2) of FIG. 28 is less than a predetermined threshold value (FIG. 28-(3)). If a result of the determination is affirmative, a handover is started by a conventional procedure (FIG. 28-(4)). If a result of the determination is negative, a setting of the candidate path comprising a wire path is performed (FIG. 28-(5)). Then, the operation is ended (FIG. 28-(6)).

A description will now be given, with reference to FIG. 29, of the eighteenth embodiment of the present invention.

Figure 29:
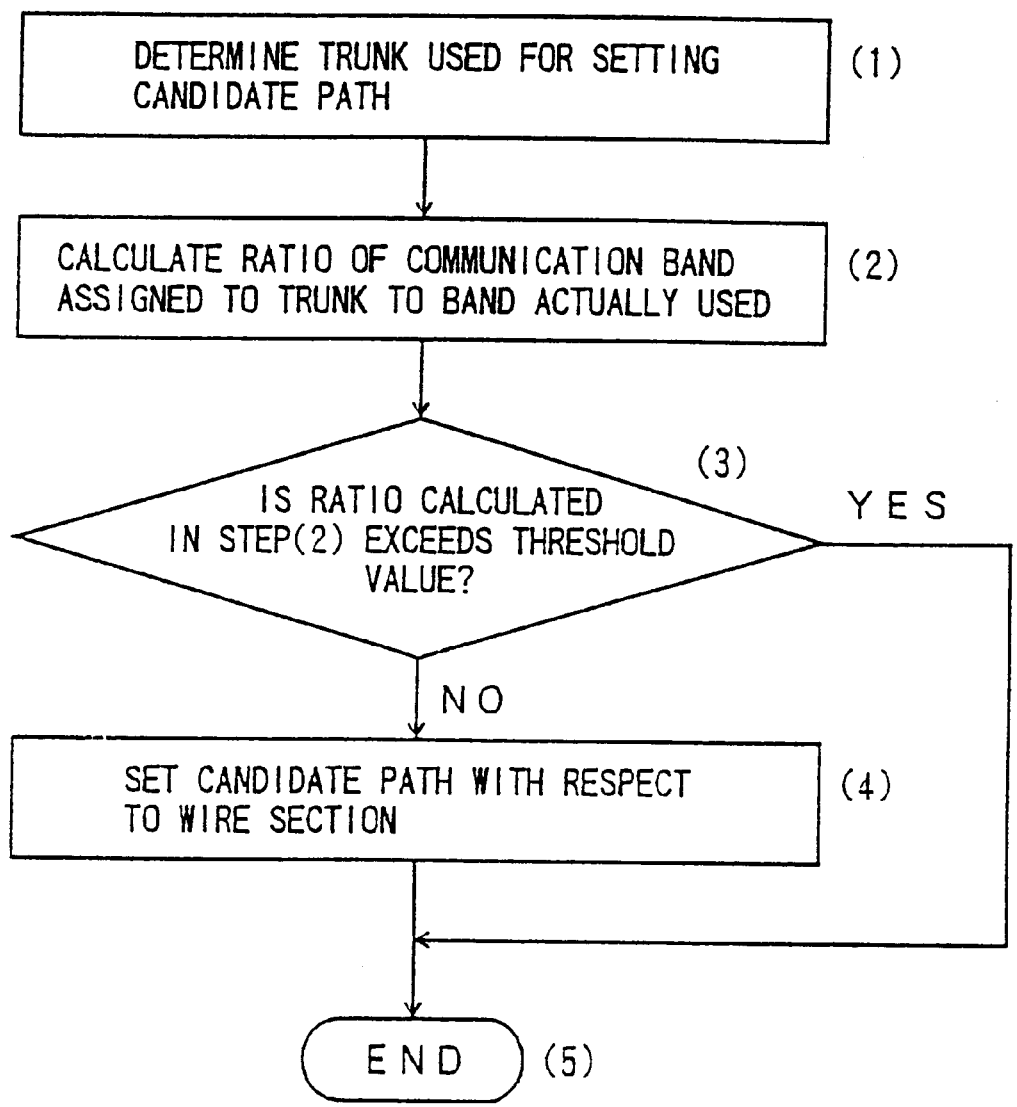
FIG. 29 is a flowchart of an operation performed in an eighteenth embodiment of the present invention.

The candidate zone selecting means determines a trunk used when the candidate path is set with respect to the selected candidate cell (FIG. 29-(1)). Then, the candidate zone selecting means obtain a ratio of a communication band assigned to the trunk determined in step (1) (FIG. 29-(1)) to a ratio of a communication band actually used (FIG. 29-(2)).

It is then determined whether or not the ratio obtained in step (2) (FIG. 29-(2)) exceeds a predetermined threshold value (FIG. 29-(3)). If a result of the determination is affirmative, the operation of the candidate zone selecting means is ended without setting a candidate path (FIG. 29-(5)). If a result of the determination is negative, the candidate zone selecting means starts setting a candidate path with respect to the candidate cell (FIG. 29-(4)). Then, the operation is ended (FIG. 29-(5)).

In the above-mentioned first embodiment, although a procedure of a process is not described when all of the moving patterns cannot be applied to the candidate cell, the subscriber responsive table 253 or the moving pattern table 254 may be used, for example, instead of the moving pattern table 251 so as to select a candidate cell similar to the third embodiment.

Additionally, in the third embodiment, although the there is no description of a procedure of a process in a case in which all of the moving patterns registered in the subscriber responsive pattern table 253 or moving pattern table 254, a cell having a probability exceeding a predetermined threshold value may be selected as a transferee cell. Otherwise, when a direction of movement of the mobile station 231 can be detected and there is unevenness in a probability of movement of the mobile station 231 with respect to adjacent cells, candidate cell may be selected based on the probability of the movement.

Additionally, in the description of the third embodiment, although a period for obtaining a history used for dynamically updating a moving pattern, such a history may be obtained not only for a period of communication but also for a radio zone in which each mobile station is located based on a control procedure for setting a radio channel.

In the tenth embodiment, although the upper limit value of the number of the candidate cells is set based on a single criterion, any one of the following values may be adopted as the upper limit value of the number of the candidate cells.

(1) A maximum value of an upper limit values (hereinafter referred to as a plurality of upper limit values) of the number of the candidate cells obtained in the same manner as that of the tenth embodiment.

(2) A minimum value of the plurality of upper limit values.

(3) An upper limit value obtained base on the attribute (criterion) having a maximum priority from among the plurality of upper limit values, the priority being priorly obtained to be adopted to a form of a system structure or an operation with respect to attributes, such as a communication quality, a number of connections, a probability of loss, a level of congestion of a speed of movement of a mobile station, which are criteria for obtaining the plurality of upper limit values.

(4) A value of weighted average of the plurality of upper limit values based on the abovementioned priority as a weight.

(5) An integer obtained by rounding an average value of the plurality of upper limit values.

Additionally, in the above mentioned embodiments, although a number of calls or connections is adopted as resources used for determining an upper limit value of the number of cells to be selected with respect to a completed call, such resources may be any one which can be adapted to a service to be provided to the mobile station 231 or a form of an operation required for the mobile exchange 235 or the radio base stations 233-1 to 233-N.

Additionally, in the above-mentioned embodiments, no description is provided as to criteria which is used for determining a time to start a release operation with respect to a path which was previously set for a candidate cell which was not turned to a transferee cell when the transferee cell is fixed. Either one of the followings may be adopted as the criteria:

(1) when a cell which does not correspond to one of the candidate cells is determined as a transferee cell; or (2) when a completed call is ended (includes a case in which the completed call is forcibly disconnected based on a procedure of a call process or a setting control of a radio channel).

Additionally, in the first to twelfth embodiments, although a procedure of a process for selecting a path to be released from among paths priorly set to the candidate cells, the processor 241 may start a timer of a predetermined time interval at a time when the path is set so as to release a path corresponding to the timer that is expired is completed (excluding a path of the transferee cell). It should be noted that the criterion (a distance between a transferee cell and a candidate cell) for selecting a path to be released which is used in the thirteenth embodiment may be used together with the above-mentioned timer.

Additionally, in the above-mentioned embodiments, although a level of a transmission quality is recognized based on an electric field intensity, it is not limited to the electric field intensity and, for example, the transmission quality may be recognized based on a bit error rate of a pilot signal transmitted and received in accordance with a procedure of a setting control of a radio channel or an error on a signal space.

Further, in the above-mentioned embodiments, although the radio base stations 233-1 to 233-N are located in a different site from the mobile exchange 235 and are connected via the transmission paths 234-1 to 234-N, the present invention is not limited to a mobile communication system having such a structure. That is, the present invention may be applied to a mobile communication system comprising a single mobile exchange and an apparatus having a function equivalent to the radio base stations 233-1 to 233-N which apparatus is connected to the mobile exchange.

Additionally, in the above-mentioned embodiments, although a function of each of the radio base stations 233-1 to 233-N and the mobile exchange 235 is not specifically described, a function may be distributed in any mode to the radio base stations 233-1 to 233-N and the mobile exchange 235 as long as the function to be added to achieve the abovementioned first to thirteenth embodiments conforms to a setting control of a radio channel and a control procedure of a call process.

Further, in the above-mentioned embodiments, although a zone structure, a method of a setting control of a radio channel and a transmission system (a modulation method or a multi-connection method) applied to the radio channel are not specifically described, the present invention can be applied irrespective of a zone structure, a method of a setting control of a radio channel and a transmission system applied to the radio channel.

Additionally, in the above-mentioned embodiments, although for the most part of the process related to the present invention is performed by the processor 241 provide in the mobile exchange 235, the present invention is not limited to such a structure and, for example, the load may be dispersed to the mobile exchange 235 and the radio base stations 233-1 to 233-N so as to perform an equivalent process and the mobile exchange 235 and the radio base stations 233-1 to 233-N may be unitized.

Additionally, in the above-mentioned embodiments, although a setting of a path is performed on a candidate cell formed under control of the mobile exchange different from the mobile exchange in which a completed call is originated in the same manner as that of other candidate cells and a communication path is formed when the candidate cell becomes a transferee cell, a communication path may be formed concurrently with a setting of a path by the mobile exchange for such a candidate cell formed under a control of a different mobile exchange.

Additionally, in such a case, the above-mentioned path may be set to a transmission path provided between the mobile exchanges in accordance with a procedure of a call process.

Additionally, in the above-mentioned embodiments, although the database 240 is provided to the mobile exchange 235, the database 240 may be provided to a service control node via a predetermined signal link as shown by dashed lines in FIG. 3.

It should be noted that in the above-mentioned embodiments, although the moving pattern storing means, the moving pattern history means, the shift probability storing means, the candidate zone selecting means, the moment predicting means, the moving speed measuring means and the transmission quality measuring means are located on the network side, a dispersion of functions may be attempted between the mobile station and the mobile exchanges by locating these means in the mobile station. That is, by locating these means in the mobile station, the mobile station can select a candidate cell by itself. This can greatly reduce a process load of the network.

The present invention is not limited to the specifically disclosed embodiments, and variations and modifications may be made without departing from the scope of the present invention.

What is claimed is:

1. A mobile communication system comprising:
   a plurality of radio base stations forming respective radio communication zones according to one of a small zone structure and a sector structure, each of said radio base stations performing a radio channel setting control including a handover with respect to a call originated for a mobile station located in one of said radio communication zones; and
   an exchange connected to each of said radio base stations via a communication link so that said exchange performs a call process of said call in association with the radio channel setting control performed by said radio base stations,
   said mobile communication system further comprising:
   a movement predicting unit which predicts, after said call becomes a completed call and prior to a handover operation, a movement of said mobile station from one of said radio communication zones in which said mobile station is located to another one of said communication zones adjacent to said one of said radio communication zones, a prediction of said movement being performed based on at least one of procedures of the radio channel setting control and the call process;
   a candidate zone selecting unit which is activated when said movement is predicted by said movement predicting unit so as to select candidate radio communication zones which are candidates for transferring said completed call to, based on said predicted movement, said candidate zone selecting unit forming a communication path to said candidate radio communication zones, said communication path to be connected to a radio channel in said communication link prior to initiation of a handover to a radio communication zone from among said candidate radio communication zones, wherein an asynchronous transfer mode is applied to said communication link, and said candidate zone selecting unit logically forms a path without occupying a transmission band of said communication link,
   wherein said radio base station and said exchange include means for acquiring a transmission band of a path formed by said candidate zone selecting unit with respect to the candidate radio communication zone which corresponds to a radio communication zone selected for handover of the completed call based on procedures of the radio channel setting control and the call process.

2. The mobile communication system as claimed in claim 1, wherein said radio base station and said exchange include means for determining whether or not the candidate radio communication zone selected by said candidate zone selecting unit has a possibility to become a radio communication zone selected for handover of a completed call based on the procedures of the radio channel setting control and the call process so as to release the acquired transmission band of a path of a candidate radio communication path to which a negative result of a determination is made.

3. A mobile communication system comprising:
   a plurality of radio base stations forming respective radio communication zones according to one of a small zone structure and a sector structure, each of said radio base stations performing a radio channel setting control including a handover with respect to a call originated for a mobile station located in one of said radio communication zones; and
   an exchange connected to each of said radio base stations via a communication link so that said exchange performs a call process of said call in association with the radio channel setting control performed by said radio base stations,
   said mobile communication system further comprising:
   a movement predicting unit which predicts, after said call becomes a completed call and prior to a handover operation, a movement of said mobile station from one of said radio communication zones in which said mobile station is located to another one of said communication zones adjacent to said one of said radio communication zones, a prediction of said movement being performed based on at least one of procedures of the radio channel setting control and the call process; and
   a candidate zone selecting unit which is activated when said movement is predicted by said movement predicting unit so as to select candidate radio communication zones which are candidates for transferring said completed call to, based on said predicted movement, said candidate zone selecting unit forming a communication path corresponding to said communication link to said candidate radio communication zones, wherein each of said radio base stations includes means for determining whether or not a radio communication zone selected for handover corresponds to one of said radio communication zones during a process of a handover of said completed call, and for acquiring a free radio channel of said one of said candidate radio communication zones when a result of a determination is affirmative and after initiation of a handover to said one of said radio communication zones, said means connecting said acquired free radio channel to the communication link formed by said candidate zone selecting unit.

4. The mobile communication system as claimed in claim 3, further comprising:

a zone structure storing unit in which a correspondence between each of said plurality of radio communication zones and an exchange controlling radio base stations forming the respective radio communication zones is previously stored, wherein said candidate zone selecting unit includes means for selecting, from among the selected candidate radio communication zones, a candidate radio communication zone formed by a radio base station controlled by an exchange which is different from an exchange having a radio base station forming a radio communication zone corresponding to a radio communication zone selected for handover by referring to the correspondence stored in said zone structure storing unit so as to exclude remaining candidate radio communication zones other that said candidate radio communication zone based on an attribute of a completed call obtained based on at least one of the radio channel setting control and the call process, and the attribute of the completed call of which candidate radio communication zone is to be excluded is a service quality required for the completed call which should be less than a predetermined threshold value.

5. The mobile communication system as claimed in claim 3, further comprising an adjacent zone storing unit in which discrimination information with respect to each of said plurality of radio communication zones is stored, wherein said candidate zone selecting unit determines whether or not a service quality required for the completed call is greater than a predetermined threshold level so as to obtain all of radio communication zones adjacent to the radio communication zone in which said mobile station having a completed call is located when a result of a determination is affirmative, said candidate zone selecting unit selecting the obtained radio communication zones as the candidate radio communication zones.

6. The mobile communication system as claimed in claim 3, wherein an asynchronous transfer mode is applied to said communication link, and said candidate zone selecting unit logically forms a communication path without occupying a transmission band of said communication link, wherein said radio base station and said exchange include means for acquiring a transmission band of a communication path formed by said candidate zone selecting unit with respect to the candidate radio communication zone which corresponds to a candidate radio communication zone selected for handover of the completed call based on procedures of the radio channel setting control and the call process.

7. The mobile communication system as claimed in claim 6, wherein said radio base station and said exchange include means for determining whether or not the candidate radio communication zone selected by said candidate zone selecting unit has a possibility to become a candidate radio communication zone selected for handover of a completed call based on the procedures of the radio channel setting control and the call process so as to release the acquired transmission band of a path of a candidate radio communication path to which a negative result of a determination is made.

8. The mobile communication system as claimed in claim 3, wherein said exchange includes means for obtaining a priority of services required for a completed call based on the procedure of the call process, and said candidate zone selecting unit includes means for setting a higher value to an upper limit value of a number of selectable candidate radio communication zones with respect to said completed call as the priority obtained by said exchange is increased.

9. The mobile communication system as claimed in claim 3, wherein said exchange includes means for obtaining a service quality required for a completed call based on the procedure of the call process, and said candidate zone selecting unit includes means for setting a higher value to an upper limit value of a number of selectable candidate radio communication zones with respect to said completed call as the service quality obtained by said exchange is increased.

10. The mobile communication system as claimed in claim 3, wherein said exchange includes means for obtaining an amount of resources assigned to a completed call, and said candidate zone selecting unit includes means for setting a higher value to an upper limit value of a number of selectable candidate radio communication zones with respect of said completed call as the amount of resources obtained by said exchange is increased.

11. The mobile communication system as claimed in claim 3, wherein said exchange includes means for obtaining an amount of resources assigned to a completed call, and said candidate zone selecting unit includes means for setting a lower value to an upper limit value of a number of selectable candidate radio communication zones with respect to said completed call as the amount of resources obtained by said exchange is increased.

12. The mobile communication system as claimed in claim 3, wherein said exchange includes means for measuring its call incompletion rate of probability, and said candidate zone selecting unit sets a lower value to an upper limit value of a number of selectable candidate radio communication zones with respect to said completed call as the rate of probability measured by said exchange is increased.

13. The mobile communication system as claimed in claim 3, wherein said exchange includes means for measuring a level of congestion of said exchange, and said candidate zone selecting unit sets a lower value to an upper limit value of a number of selectable candidate radio communication zones with respect to said completed call as the level of congestion measured by said exchange is increased.

14. The mobile communication system as claimed in claim 3, wherein said exchange includes means for determining whether or not a candidate radio communication zone selected for handover of the completed call of said mobile station corresponds to one of the candidate radio communication zones selected by said candidate zone selecting unit in a process of a handover of the completed call so as to determine whether a method for releasing or a method for storing is applied to a communication link set to the candidate radio communication zone when a result of a determination is negative.

15. The mobile communication system as claimed in claim 3, wherein said exchange includes means for determining whether to acquire a free radio channel after a completion of a setting of a communication link by said candidate zone selecting unit or to perform a handover without waiting for the completion of the setting of the communication link when a handover request is generated by said mobile station during a setting operation of the communication link by said candidate zone selecting unit.

16. The mobile communication system as claimed in claim 3, wherein said exchange predicts a time when a setting of the communication link is completed by said candidate zone selecting unit and a time when a handover request is generated, and when it is determined that the time when the setting of the communication link and the time when the handover request is generated are short, said exchange performs a handover and otherwise said exchange performs a setting of the communication link prior to a handover.

17. The mobile communication system as claimed in claim 3, wherein said exchange does not perform a setting of a communication link by said candidate zone selecting unit when a level of use of it own resources exceeds a predetermined threshold value.

18. The mobile communication system as claimed in claim 3, further comprising a moving pattern storing unit in which a moving pattern is previously registered, said moving pattern indicated by a permutation of discrimination information with respect to said radio communication zones through which one of a railway or a road crosses,
    wherein said candidate zone selecting unit selects, as said candidate radio communication zones, subsequent radio communication zones indicated by a moving pattern having a high correlation with said moving pattern registered in said moving pattern storing unit, the moving pattern having a high correlation corresponding to a train of discrimination information including a current radio communication zone in which said mobile station is currently located and a previous radio communication zone in which said mobile station was previously located.

19. The mobile communication system as claimed in claim 3, further comprising a moving pattern storing unit in which a moving pattern announced by a subscriber of said mobile station is previously registered, said moving pattern indicated by a permutation of discrimination information with respect to said radio communication zones through which one of a railway or a road crosses so that said mobile station moves along said one of the railway or the road with a high probability,
    wherein said candidate zone selecting unit selects, as said candidate radio communication zones, subsequent radio communication zones indicated by a moving pattern having a high correlation with said moving pattern registered in said moving pattern storing unit, the moving pattern having a high correlation corresponding to a train of discrimination information including a current radio communication zone in which said mobile station is currently located and a previous radio communication zone in which said mobile station was previously located.

20. The mobile communication system as claimed in claim 3, further comprising a moving pattern history unit which obtains a history of the radio communication zones in which said mobile station is located from among said plurality of radio communication zones so as to record the history as a train of discrimination information with respect to the radio communication zones without cooperating with said mobile station,
    wherein said candidate zone selecting unit selects, as said candidate radio communication zones, subsequent radio communication zones indicated by a moving pattern having a high correlation with a moving pattern recorded in said moving pattern history unit with respect to a mobile station in which a completed call is originated, the moving pattern having a high correlation corresponding to a train of discrimination information including a current radio communication zone in which said mobile station is currently located and a previous radio communication zone in which said mobile station was previously located.

21. The mobile communication system as claimed in claim 3, further comprising a moving pattern history unit which obtains a history of the radio communication zones in which said mobile station is located from among said plurality of radio communication zones so as to record the history as a train of discrimination information with respect to the radio communication zones by cooperating with said mobile station,
    wherein said candidate zone selecting unit selects, as said candidate radio communication zones, subsequent radio communication zones indicated by a moving pattern having a high correlation with said moving pattern recorded in said moving pattern history unit with respect to a mobile station in which a completed call is originated, the moving pattern having a high correlation corresponding to a train of discrimination information including a current radio communication zone in which said mobile station is currently located and a previous radio communication zone in which said mobile station was previously located.

22. The mobile communication system as claimed in claim 3, further comprising a shift probability storing unit which stores a probability to become a radio communication zone to be handover with respect to each of said plurality of radio communication zones, the probability being previously obtained by a simulation or an actual measurement based on a distribution of at least one of a road and a railway and a distribution of a traffic of said mobile station in at least one of the road and the railway,
    wherein said candidate zone selecting unit includes means for excluding a candidate radio communication zone having the probability less than a predetermined lower limit value from among the probabilities registered in said shift probability storing unit or providing a higher priority as the probability of shift is higher.

23. The mobile communication system as claimed in claim 3, further comprising an adjacent zone storing unit in which discrimination information of the radio communication zones adjacent to each of said plurality of radio communication zones is registered,
    wherein said candidate zone selecting unit includes means for determining whether or not the selected candidate radio communication zone corresponds to a radio communication zone adjacent to a radio communication zone which receives a handover so as to exclude a candidate radio communication zone to which a negative result of a determination is made.

24. The mobile communication system as claimed in claim 3, further comprising a zone structure storing unit in which a correspondence between each of said plurality of radio communication zones and an exchange controlling radio base stations forming the respective radio communication zones is previously stored, wherein said candidate zone selecting unit includes means for selecting, from among the selected candidate radio communication zones, a candidate radio communication zone formed by a radio base station controlled by an exchange which is different from an exchange having a radio base station forming a radio communication zone which receives a handover by referring to the correspondence stored in said zone structure storing unit so as to exclude remaining candidate radio communication zones other than said candidate radio communication zone based on an attribute of a completed call obtained based on at least one of the radio channel setting control and the call process.

25. The mobile communication system as claimed in claim 3, further comprising an adjacent zone storing unit in which discrimination information with respect to each of said plurality of radio communication zones is stored, wherein said candidate zone selecting unit determines whether or not a service quality required for the completed call is greater than a predetermined threshold level so as to obtain all of radio communication zones adjacent to the radio communication zone in which said mobile station having a completed call is located when a result of a determination is affirmative, said candidate zone selecting unit selecting the obtained radio communication zones as the candidate radio communication zones.

26. The mobile communication system as claimed in claim 3, further comprising a moving speed measuring unit which measures a speed of movement of said mobile station in which a completed call is originated, wherein said candidate zone selecting unit sets a higher value to an upper limit value of a number of selectable candidate radio communication zones with respect to said completed call as the speed measured by said moving speed measuring unit is increased.

27. The mobile communication system as claimed in claim 3, further comprising a transmission quality measuring unit which measures a transmission quality at a predetermined frequency with respect to a completed call, wherein said movement predicting unit predicts whether said mobile station in which said completed call is originated moves to one of the adjacent radio communication zones when the transmission quality is measured by said transmission quality measuring unit.

28. The mobile communication system as claimed in claim 3, further comprising a transmission quality measuring unit which measures a transmission quality at a predetermined frequency with respect to a completed call, wherein said movement predicting unit predicts that said mobile station in which said completed call is generated moves to one of the adjacent radio communication zones when the transmission quality of a current radio communication zone is less than a predetermined threshold value or when the transmission quality of one of the adjacent radio communication zones is greater than the predetermined threshold value.

29. The mobile communication system as claimed in claim 3, further comprising a transmission quality measuring unit which measures a transmission quality and a rate of change in the transmission quality at a predetermined frequency with respect to a completed call, wherein said movement predicting unit predicts a moment when said mobile station in which said completed call is generated moves to one of the adjacent radio communication zones when the transmission quality of a current radio communication zone is less than a predetermined threshold value and based on the rate of change measured by said transmission quality measuring unit or when the transmission quality of one of the adjacent radio communication zones is greater than the predetermined threshold value and based on the rate of change measured by said transmission quality measuring unit.

30. The mobile communication system as claimed in claim 3, further comprising a moving speed measuring unit which measures a speed of movement of said mobile station in which a completed call is originated, wherein said movement predicting unit predicts a moment of movement of said mobile station to one of the adjacent radio communication zones to be earlier as the speed measured by said moving speed measuring unit is increased.

31. The mobile communication system as claimed in claim 3, further comprising a distance storing unit in which a geographic distance between adjacent radio communication zones for all combinations of two radio communication zones in said plurality of radio communication zones is stored, wherein said radio base station and said exchange comprise means for releasing a communication path formed by said candidate zone selecting unit, the communication path being formed for a candidate radio communication zone having the distance registered in said distance storing unit as a combination of radio communication zones corresponding to a radio communication zone receiving a handover which is greater than a predetermined threshold value from among candidate radio communication zones selected by said candidate zone selecting unit.

32. The mobile communication system as claimed in claim 3, wherein said exchange includes means for determining whether or not a radio communication zone receiving a handover of said mobile station corresponds to one of the candidate radio communication zones selected by said candidate zone selecting unit in a process of a handover of the completed call so as to use a communication link set to the candidate radio communication zone for a call or a handover when a result of a determination is negative.

33. A mobile communication system comprising:
a mobile station which can be located in one of a plurality of radio communication zones according to a small zone structure or a sector structure;
a plurality of radio base stations forming said respective radio communication zones, each of said radio base stations performing a radio channel setting control including a handover with respect to a call originated for said mobile station located in one of said radio communication zones; and
an exchange connected to each of said radio base stations via a communication link so that said exchange performs a call process of said call in association with the radio channel setting control performed by said radio base stations,
said mobile communication system further comprising:
a candidate zone notification unit which selects, after said call becomes a completed call, candidate radio communication zones which are candidates for transferring the completed call to so as to announce the candidate radio communication zones to said mobile station; and a candidate zone selecting unit which forms a communication path in said communication link to said candidate radio communication zones and acquires a free radio channel of the candidate radio communication zones selected by said candidate zone selecting unit when a request is provided from said mobile station and after initiation of a handover, and connects a communication path to said free radio channel, wherein said mobile station includes a movement predicting unit which predicts a movement of said mobile station from one of said radio communication zones in which said mobile station is located to another one of said radio communication zones adjacent to said one of said radio communication zones, and when a result of a prediction indicates one of the candidate radio communication zones announced by said candidate zone notification unit, said movement predicting unit provides the result to said candidate zone selecting unit as said request.

34. The mobile communication system as claimed in claim 33, further comprising a moving pattern storing unit in which a moving pattern is previously registered, said moving pattern indicated by a permutation of discrimination information with respect to said radio communication zones through which one of a railway or a road crosses, wherein said candidate zone selecting unit selects, as said candidate radio communication zones, subsequent radio communication zones indicated by a moving pattern having a high correlation with said moving pattern registered in said moving pattern storing unit, the moving pattern having a high correlation corresponding to a train of discrimination information including a current radio communication zone in which said mobile station is currently located and a previous radio communication zone in which said mobile station was previously located.

35. The mobile communication system as claimed in claim 33, further comprising a moving pattern storing unit in which a moving pattern announced by a subscriber of said mobile station is previously registered, said moving pattern indicated by a permutation of discrimination information with respect to said radio communication zones through which one of a railway or a road crosses so that said mobile station moves along said one of the railway or the road with a high probability, wherein said candidate zone selecting unit selects, as said candidate radio communication zones, subsequent radio communication zones indicated by a moving pattern having a high correlation with said moving pattern registered in said moving pattern storing unit, the moving pattern having a high correlation corresponding to a train of discrimination information including a current radio communication zone in which said mobile station is currently located and a previous radio communication zone in which said mobile station was previously located.

36. The mobile communication system as claimed in claim 33, further comprising a moving pattern history unit which obtains a history of the radio communication zones in which said mobile station is located from among said plurality of radio communication zones so as to record the history as a train of discrimination information with respect to the radio communication zones without cooperating with said mobile station, wherein said candidate zone selecting unit selects, as said candidate radio communication zones, subsequent radio communication zones indicated by a moving pattern having a high correlation with a moving pattern recorded in said moving pattern history unit with respect to a mobile station in which a completed call is originated, the moving pattern having a high correlation corresponding to a train of discrimination information including a current radio communication zone in which said mobile station is currently located and a previous radio communication zone in which said mobile station was previously located.

37. The mobile communication system as claimed in claim 33, further comprising a moving pattern history unit which obtains a history of the radio communication zones in which said mobile station is located from among said plurality of radio communication zones so as to record the history as a train of discrimination information with respect to the radio communication zones by cooperating with said mobile station, wherein said candidate zone selecting unit selects, as said candidate radio communication zones, subsequent radio communication zones indicated by a moving pattern having a high correlation with said moving pattern recorded in said moving pattern history unit with respect to a mobile station in which a completed call is originate, the moving pattern having a high correlation corresponding to a train of discrimination information including a current radio communication zone in which said mobile station is currently located and a previous radio communication zone in which said mobile station was previously located.

38. The mobile communication system as claimed in claim 33, further comprising a shift probability storing unit which stores a probability to become a radio communication zone to be handover with respect to each of said plurality of radio communication zones, the probability being previously obtained by a simulation or an actual measurement based on a distribution of at least one of a road and a railway and a distribution of a traffic of said mobile station in at least one of the road and the railway, wherein said candidate zone selecting unit includes means for excluding a candidate radio communication zone having the probability less than a predetermined lower limit value from among the probabilities registered in said shift probability storing unit or providing a higher priority as the probability of shift is higher.

39. The mobile communication system as claimed in claim 33, further comprising an adjacent zone storing unit in which discrimination information of the radio communication zones adjacent to each of said plurality of radio communication zones is registered, wherein said candidate zone selecting unit includes means for determining whether or not the selected candidate radio communication zone corresponds to a radio communication zone adjacent to a radio communication zone which is a transferee so as to exclude a candidate radio communication zone to which a negative result of a determination is made.

40. The mobile communication system as claimed in claim 33, further comprising a zone structure storing unit in which a correspondence between each of said plurality of radio communication zones and an exchange controlling radio base stations forming the respective radio communication zones is previously stored, wherein said candidate zone selecting unit includes means for selecting, from among the selected candidate radio communication zones, a candidate radio communication zone formed by a radio base station controlled by an exchange which is different from an exchange having a radio base station forming a radio communication zone corresponding to a transferee by referring to the correspondence stored in said zone structure storing unit so as to exclude remaining candidate radio communication zones other than said candidate radio communication zone based on an attribute of a completed call obtained based on at least one of the radio channel setting control and the call process.

41. The mobile communication system as claimed in claim 33, further comprising an adjacent zone storing unit in which discrimination information with respect to each of said plurality of radio communication zones is stored, wherein said candidate zone selecting unit determines whether or not a service quality required for the completed call is greater than a predetermined threshold level so as to obtain all of radio communication zones adjacent to the radio communication zone in which said mobile station having a completed call is located when a result of a determination is affirmative, said candidate zone selecting unit selecting the obtained radio communication zones as the candidate radio communication zones.

42. The mobile communication system as claimed in claim 33, further comprising a moving speed measuring unit which measures a speed of movement of said mobile station in which a completed call is originated, wherein said candidate zone selecting unit sets a higher value to an upper limit value of a number of selectable candidate radio communication zones with respect to said completed call as the speed measured by said moving speed measuring unit is increased.

43. The mobile communication system as claimed in claim 33, further comprising a transmission quality measuring unit which measures a transmission quality at a predetermined frequency with respect to a completed call, wherein said movement predicting unit predicts whether said mobile station in which said completed call is originated moves to one of the adjacent radio communication zones when the transmission quality is measured by said transmission quality measuring unit.

44. The mobile communication system as claimed in claim 33, further comprising a transmission quality measuring unit which measures a transmission quality at a predetermined frequency with respect to a completed call, wherein said movement predicting unit predicts that said mobile station in which said completed call is generated moves to one of the adjacent radio communication zones when the transmission quality of a current radio communication zone is less than a predetermined threshold value or when the transmission quality of one of the adjacent radio communication zones is greater than the predetermined threshold value.

45. The mobile communication system as claimed in claim 33, further comprising a transmission quality measuring unit which measures a transmission quality and a rate of change in the transmission quality at a predetermined frequency with respect to a completed call, wherein said movement predicting unit predicts a movement when said mobile station in which said completed call is generated moves to one of the adjacent radio communication zones when the transmission quality of a current radio communication zone is less than a predetermined threshold value and based on the rate of change measured by said transmission quality measuring unit or when the transmission quality of one of the adjacent radio communication zones is greater than the predetermined threshold value and base on the rate of change measured by said transmission quality measuring unit.

46. The mobile communication system as claimed in claim 33, further comprising a moving speed measuring unit which measures a speed of movement of said mobile station in which a completed call is originated, wherein said movement predicting unit predicts a movement of movement of said mobile station to one of the adjacent radio communication zones to be earlier as the speed measured by said moving speed measuring unit is increased.

47. The mobile communication system as claimed in claim 33, further comprising a distance storing unit in which a geographic distance between adjacent radio communication zones for all combinations of two radio communication zones in said plurality of radio communication zones, wherein said radio base station and said exchange comprise means for releasing a path formed by said candidate zone selecting unit, the path being formed for a candidate radio communication zone having the distance registered in said distance storing unit as a combination of radio communication zones corresponding to a transferee which is greater than a predetermined threshold value from among candidate radio communication zones selected by said candidate zone selecting unit.

48. The mobile communication system as claimed in claim 33, wherein said exchange includes means for determining whether or not a transferee of said mobile station corresponds to one of the candidate radio communication zones selected by said candidate zone selecting unit in a process of a handover of the completed call so as to use a communication link set to the candidate radio communication zone for a call or a handover when a result of a determination is negative.

49. The mobile communication system as claimed in claim 33, further comprising:

a zone structure storing unit in which a correspondence between each of said plurality of radio communication zones and an exchange controlling radio base stations forming the respective radio communication zones is previously stored, wherein said candidate zone selecting unit includes means for selecting, from among the selected candidate radio communication zones, a candidate radio communication zone formed by a radio base station controlled by an exchange which is different from an exchange having a radio base station forming a radio communication zone corresponding to a radio communication zone selected for handover by referring to the correspondence stored in said zone structure storing unit so as to exclude remaining candidate radio communication zones other that said candidate radio communication zone based on an attribute of a completed call obtained based on at least one of the radio channel setting control and the call process, and the attribute of the completed call of which candidate radio communication zone is to be excluded is a service quality required for the completed call which should be less than a predetermined threshold value.

50. The mobile communication system as claimed in claim 31, further comprising an adjacent zone storing unit in which discrimination information with respect to each of said plurality of radio communication zones is stored, wherein said candidate zone selecting unit determines whether or not a service quality required for the completed call is greater than a predetermined threshold level so as to obtain all of radio communication zones adjacent to the radio communication zone in which said mobile station having a completed call is located when a result of a determination is affirmative, said candidate zone selecting unit selecting the obtained radio communication zones as the candidate radio communication zones.

51. The mobile communication system as claimed in claim 33, wherein an asynchronous transfer mode is applied to said communication link, and said candidate zone selecting unit logically forms a communication path without occupying a transmission band of said communication link,
wherein said radio base station and said exchange include means for acquiring a transmission band of a communication path formed by said candidate zone selecting unit with respect to the candidate radio communication zone which corresponds to a candidate radio communication zone selected for handover of the completed call based on procedures of the radio channel setting control and the call process.

52. The mobile communication system as claimed in claim 51, wherein said radio base station and said exchange include means for determining whether or not the candidate radio communication zone selected by said candidate zone selecting unit has a possibility to become a candidate radio communication zone selected for handover of a completed call based on the procedures of the radio channel setting control and the call process so as to release the acquired transmission band of a path of a candidate radio communication path to which a negative result of a determination is made.

53. The mobile communication system as claimed in claim 33, wherein said exchange includes means for obtaining a priority of services required for a completed call based on the procedure of the call process, and said candidate zone selecting unit includes means for setting a higher value to an upper limit value of a number of selectable candidate radio communication zones with respect to said completed call as the priority obtained by said exchange is increased.

54. The mobile communication system as claimed in claim 33, wherein said exchange includes means for obtaining a service quality required for a completed call based on the procedure of the call process, and said candidate zone selecting unit includes means for setting a higher value to an upper limit value of a number of selectable candidate radio communication zones with respect to said completed call as the service quality obtained by said exchange is increased.

55. The mobile communication system as claimed in claim 33, wherein said exchange includes means for obtaining an amount of resources assigned to a completed call, and said candidate zone selecting unit includes means for setting a higher value to an upper limit value of a number of selectable candidate radio communication zones with respect of said completed call as the amount of resources obtained by said exchange is increased.

56. The mobile communication system as claimed in claim 33, wherein said exchange includes means for obtaining an amount of resources assigned to a completed call, and said candidate zone selecting unit includes means for setting a lower value to an upper limit value of a number of selectable candidate radio communication zones with respect to said completed call as the amount of resources obtained by said exchange is increased.

57. The mobile communication system as claimed in claim 33, wherein said exchange includes means for measuring its call incompletion rate of probability, and said candidate zone selecting unit sets a lower value to an upper limit value of a number of selectable candidate radio communication zones with respect to said completed call as the rate of probability measured by said exchange is increased.

58. The mobile communication system as claimed in claim 33, wherein said exchange includes means for measuring a level of congestion of said exchange, and said candidate zone selecting unit sets a lower value to an upper limit value of a number of selectable candidate radio communication zones with respect to said completed call as the level of congestion measured by said exchange is increased.

59. The mobile communication system as claimed in claim 33, wherein said exchange includes means for determining whether or not a candidate radio communication zone selected for handover of the completed call of said mobile station corresponds to one of the candidate radio communication zones selected by said candidate zone selecting unit in a process of a handover of the completed call so as to determine whether a method for releasing or a method for storing is applied to a communication path set to the candidate radio communication zone when a result of a determination is negative.

60. The mobile communication system as claimed in claim 33, wherein said exchange includes means for determining whether to acquire a free radio channel after a completion of a setting of a communication path by said candidate zone selecting unit or to perform a handover without waiting for the completion of the setting of the communication path when a handover request is generated by said mobile station during a setting operation of the communication path by said candidate zone selecting unit.

61. The mobile communication system as claimed in claim 33, wherein said exchange predicts a time when a setting of the communication path is completed by said candidate zone selecting unit and a time when a handover request is generated, and when it is determined that the time when the setting of the communication path and the time when the handover request is generated are short, said exchange performs a handover and otherwise said exchange performs a setting of the communication path prior to a handover.

62. The mobile communication system as claimed in claim 33, wherein said exchange does not perform a setting of a communication path by said candidate zone selecting unit when a level of use of it own resources exceeds a predetermined threshold value.

63. A mobile communication system comprising:
a mobile station which can be located in one of a plurality of radio communication zones according to a small zone structure or a sector structure;
a plurality of radio base stations forming said respective radio communication zones, each of said radio base stations performing a radio channel setting control including a handover with respect to a call originated for said mobile station located in one of said radio communication zones; and
an exchange connected to each of said radio base stations via a communication link so that said exchange performs a call process of said call in association with the radio channel setting control performed by said radio base stations,
said mobile communication system further comprising:
a candidate zone notification unit which selects, after said call becomes a completed call, candidate radio communication zones which are candidates for transferring the completed call to so as to announce the candidate radio communication zones to said mobile station; and a candidate zone selecting unit which selects the candidate radio communication zones selected by said candidate zone notification unit when a request is provided from said mobile station, and forms a communication link to the radio base station in said candidate radio communication zones, wherein said mobile station includes a movement predicting unit which predicts a movement of said mobile station from one of said radio communication zones in which said mobile station is located to another one of said radio communication zones adjacent to said one of said radio communication zones, and when a result of a prediction indicates one of the candidate radio communication zones announced by said candidate zone notification unit, said movement predicting unit provides the result to said candidate zone selecting unit as said request; and each of said radio base stations includes means for determining whether or not a radio communication zone selected for handover corresponds to one of said radio communication zones during a process of a handover of said completed call, and for acquiring a free radio channel of said one of said candidate radio communication zones when a result of a determination is affirmative and after initiation of a handover sequence to said one of said radio communication zones, said means connecting said acquired free radio channel to the communication link formed by said candidate zone selecting unit.

* * * * *